United States Patent
Kobatake et al.

(10) Patent No.: US 9,374,254 B1
(45) Date of Patent: Jun. 21, 2016

(54) WIRELESS COMMUNICATION DEVICE AND WIRELESS COMMUNICATION METHOD

(71) Applicant: Panasonic Corporation, Osaka (JP)

(72) Inventors: Hisateru Kobatake, Osaka (JP); Shigeru Soga, Hyogo (JP); Teruaki Hasegawa, Osaka (JP); Ippei Kanno, Kyoto (JP); Yoshinobu Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 15/016,951

(22) Filed: Feb. 5, 2016

Related U.S. Application Data

(63) Continuation of application No. 14/864,693, filed on Sep. 24, 2015, now Pat. No. 9,288,092, which is a continuation of application No. 14/557,142, filed on Dec. 1, 2014, now Pat. No. 9,172,568.

(30) Foreign Application Priority Data

Jan. 16, 2014 (JP) .................................. 2014-000552

(51) Int. Cl.

| | |
|---|---|
| *H04L 27/06* | (2006.01) |
| *H04L 27/00* | (2006.01) |
| *H04L 27/26* | (2006.01) |
| *H04W 84/12* | (2009.01) |
| *H03K 9/00* | (2006.01) |

(52) U.S. Cl.
CPC ........ H04L 27/0012 (2013.01); H04L 27/2666 (2013.01); H04L 27/2672 (2013.01); H04W 84/12 (2013.01)

(58) Field of Classification Search
CPC .......... H04L 27/0012; H04L 27/0008; H04W 84/12; H04W 88/06
See application file for complete search history.

(56) References Cited

U.S. PATENT DOCUMENTS

| | | | | |
|---|---|---|---|---|
| 7,711,061 | B2* | 5/2010 | Trachewsky | H04L 1/0006 370/465 |
| 8,948,284 | B2* | 2/2015 | Park | H04L 27/2613 375/259 |
| 8,989,102 | B2* | 3/2015 | Kenney | H04L 27/2613 370/252 |
| 2005/0117664 | A1* | 6/2005 | Adan | H03D 7/1441 375/316 |
| 2006/0276146 | A1* | 12/2006 | Suzuki | H03F 1/3252 455/114.3 |
| 2010/0107042 | A1 | 4/2010 | Sawai et al. | |
| 2010/0118744 | A1* | 5/2010 | Kwon | H04B 1/406 370/278 |
| 2011/0002400 | A1* | 1/2011 | Guerrieri | H04B 3/542 375/257 |

(Continued)

FOREIGN PATENT DOCUMENTS

JP 2010-109401 5/2010

*Primary Examiner* — Erin File
(74) *Attorney, Agent, or Firm* — Seed IP Law Group PLLC

(57) ABSTRACT

A tuner receives a received signal using one of a plurality of transmission formats that use at least one of either a first frequency or a second frequency band. A determination unit determines the transmission format being used in the received signal from among the plurality of transmission formats. In the determination unit, a pattern matching unit stores in advance a plurality of patterns respectively expressing a received waveform of a preamble in each of the plurality of transmission formats, conducts a pattern matching process between the received signal and the each of the plurality of patterns, and obtains a correlation value. A transmission mode determination unit determines the transmission format being used in the received signal on the basis of the correlation value.

2 Claims, 30 Drawing Sheets

(56) References Cited

U.S. PATENT DOCUMENTS

| | | | | |
|---|---|---|---|---|
| 2011/0033051 A1* | 2/2011 | Steer | H04L 5/0007 | 380/270 |
| 2011/0090973 A1* | 4/2011 | Mishra | H04L 5/0025 | 375/260 |
| 2011/0183677 A1* | 7/2011 | Oyane | H04W 88/085 | 455/442 |
| 2012/0075150 A1* | 3/2012 | Raguenet | H01Q 1/288 | 343/711 |
| 2012/0163480 A1* | 6/2012 | Nemeth | H04B 1/707 | 375/259 |
| 2012/0324315 A1* | 12/2012 | Zhang | H04L 1/004 | 714/776 |
| 2013/0136075 A1* | 5/2013 | Yu | H04W 72/0453 | 370/329 |
| 2013/0188572 A1* | 7/2013 | Cheong | H04W 72/04 | 370/329 |
| 2014/0016796 A1* | 1/2014 | Maust | H04R 1/1041 | 381/74 |
| 2015/0036791 A1* | 2/2015 | Reichel | A61B 6/032 | 378/4 |
| 2015/0195111 A1* | 7/2015 | Kobatake | H04L 27/0012 | 375/343 |

\* cited by examiner

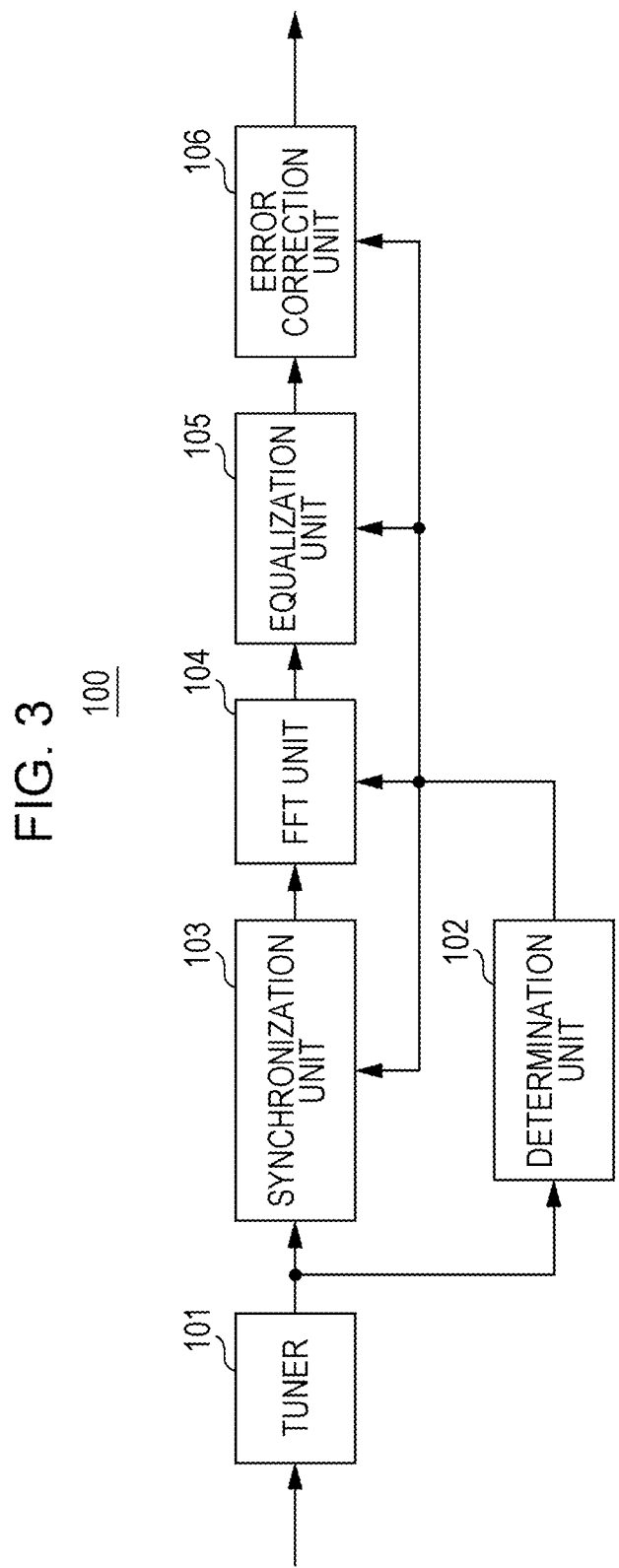

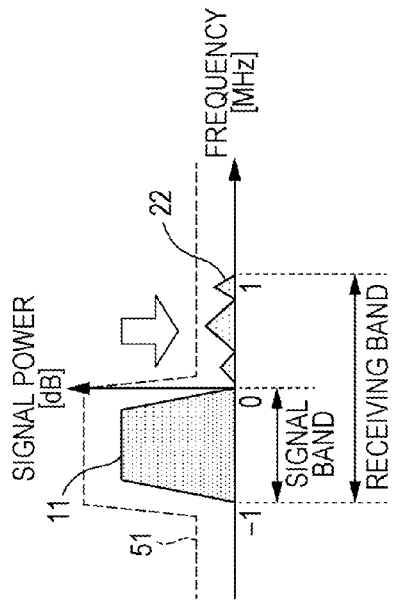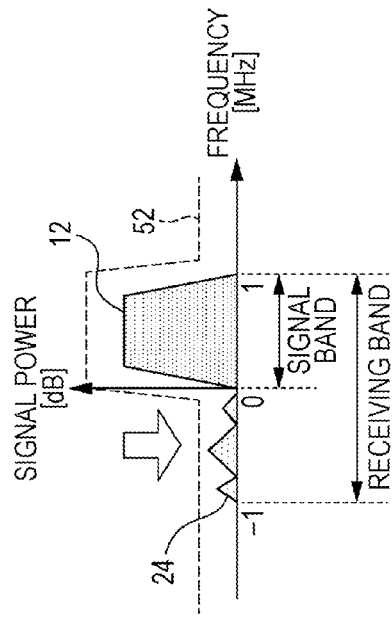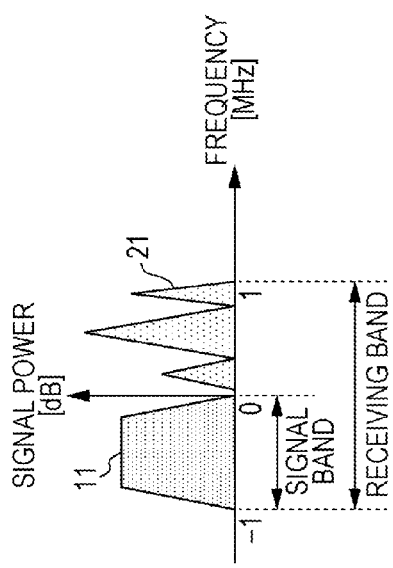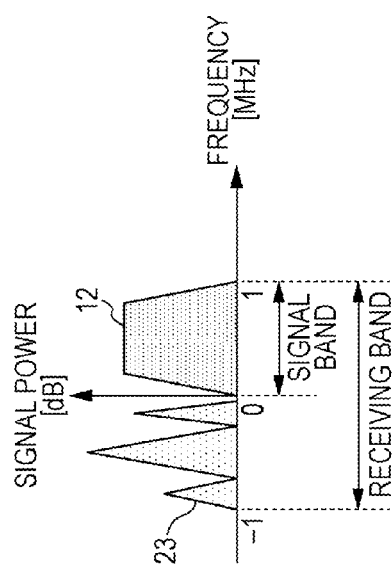

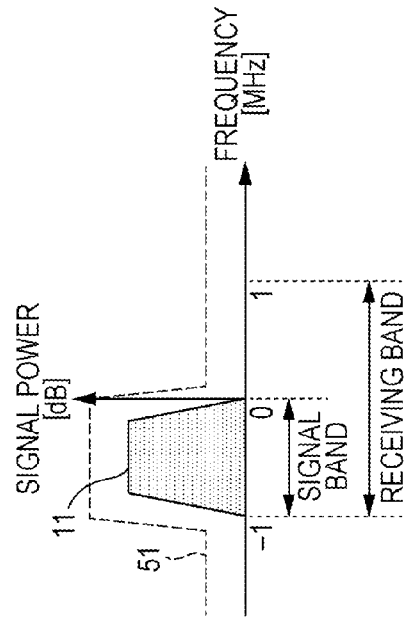
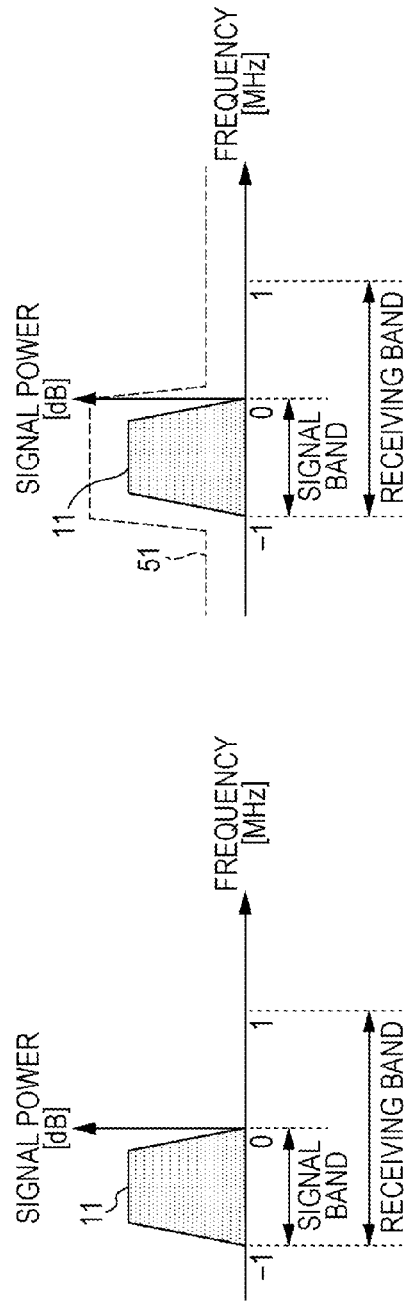
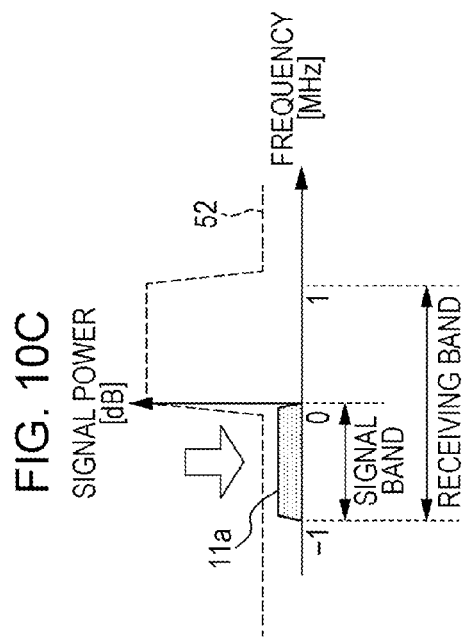

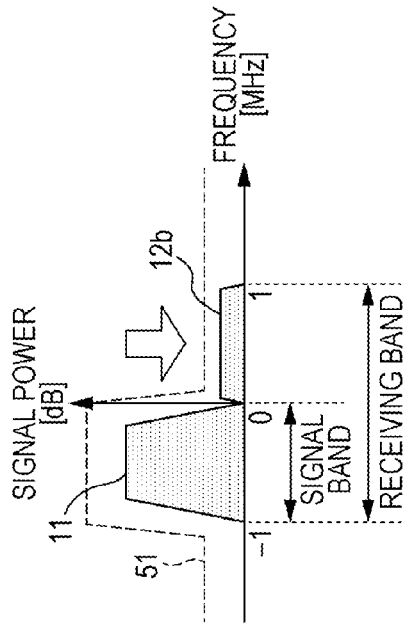
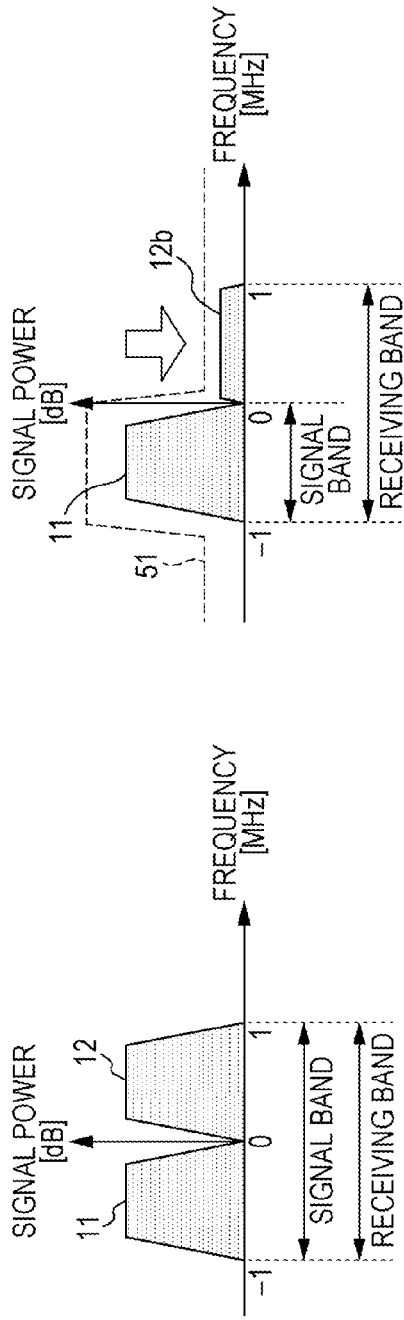
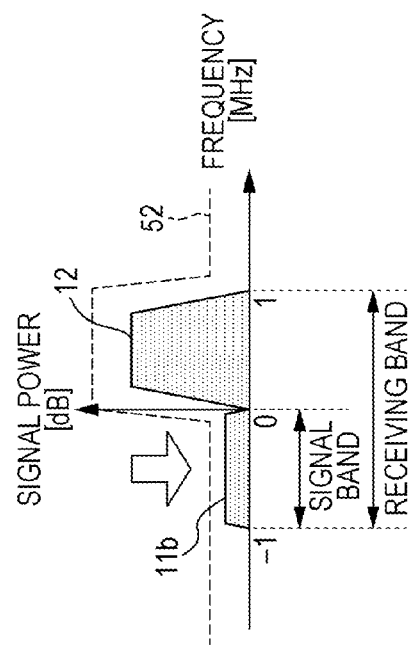

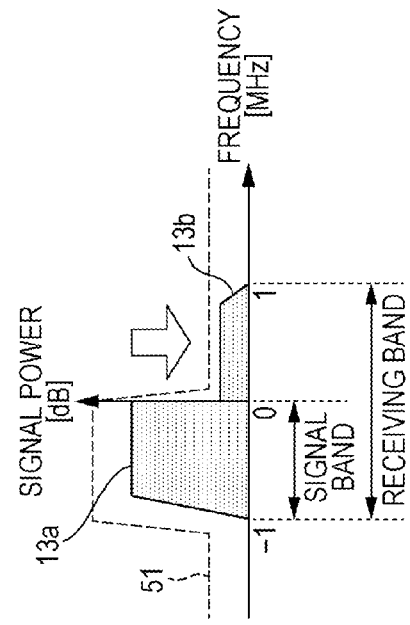
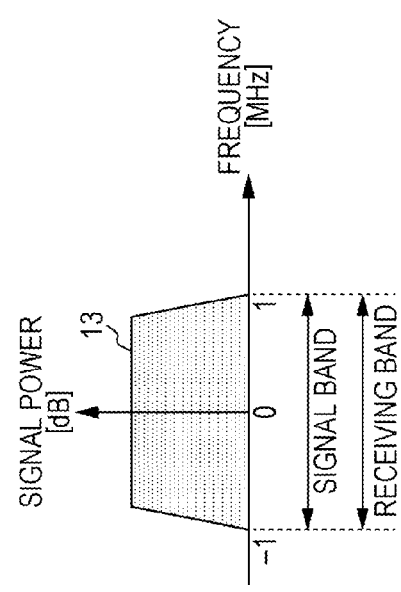
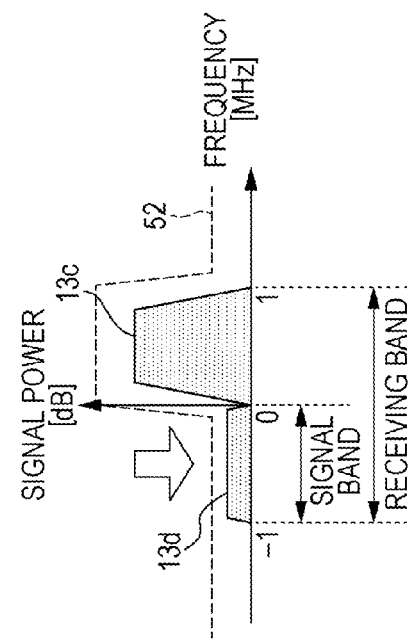

FIG. 14

| SPECTRAL PLACEMENT MODE | SIGNAL POWER DIFFERENCE OF LOWER 1 MHz BAND ACROSS BAND LIMIT 51 | SIGNAL POWER DIFFERENCE OF HIGHER 1 MHz BAND ACROSS BAND LIMIT 52 |
|---|---|---|
| 1 MHz-U (1U) | SMALL | LARGE |
| 1 MHz-L (1L) | LARGE | SMALL |
| 1 MHz-D (1D) | LARGE | LARGE |
| 2 MHz (2C) | LARGE | LARGE |

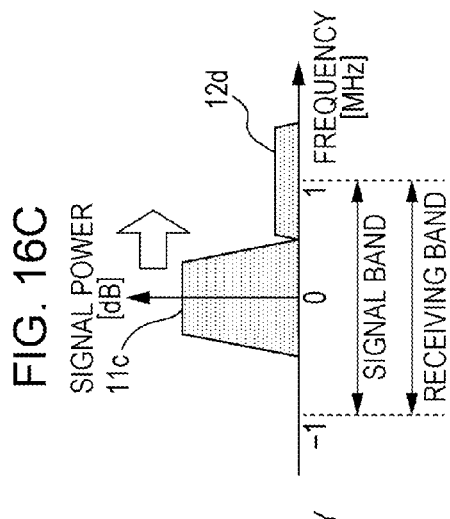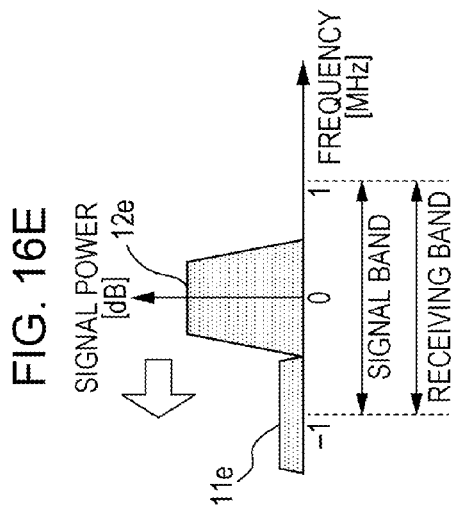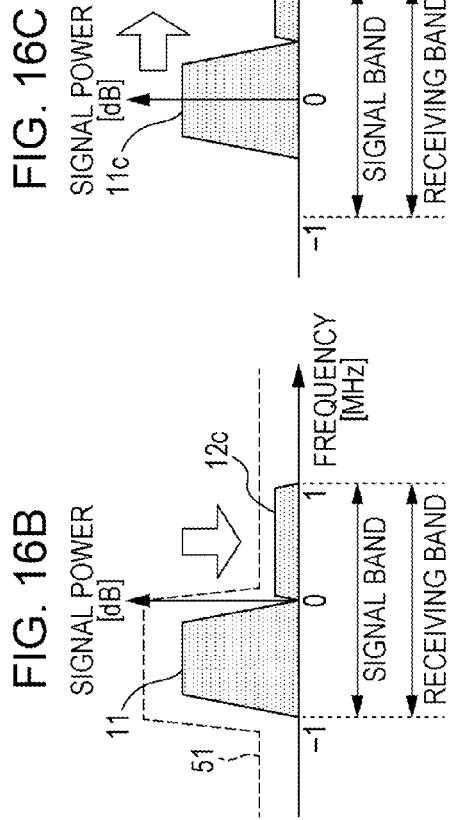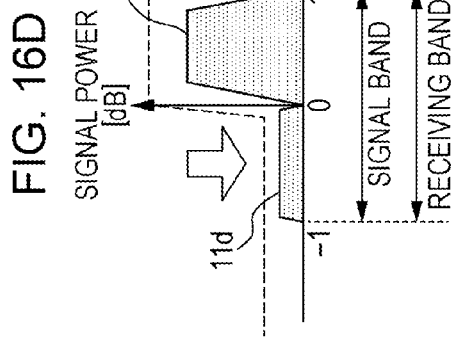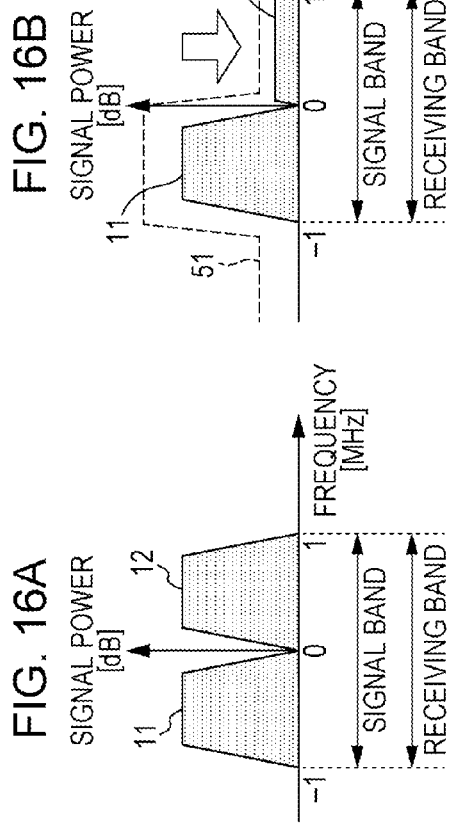

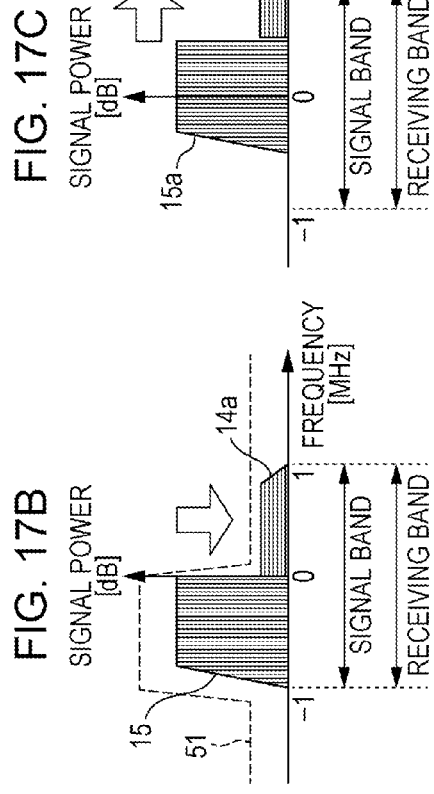
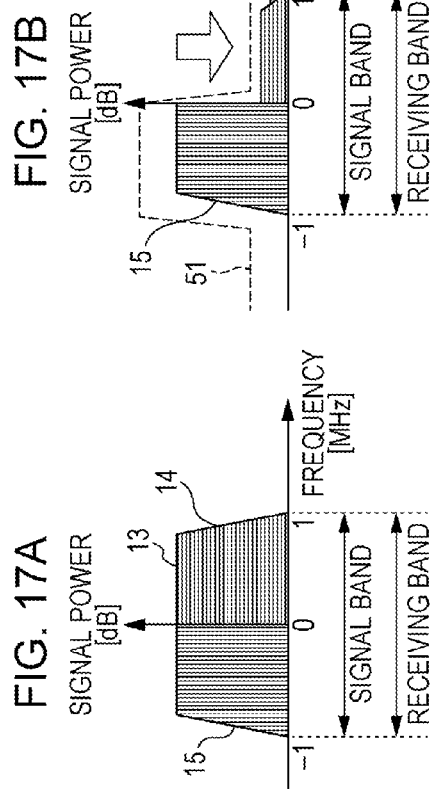
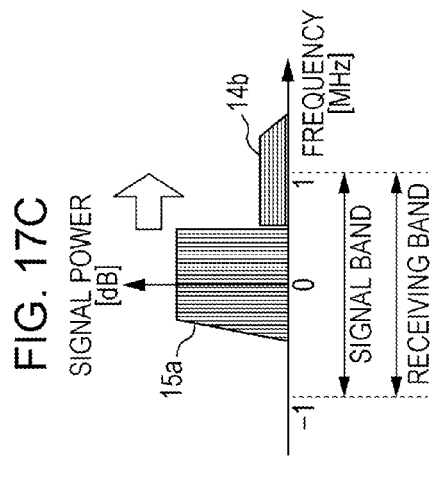
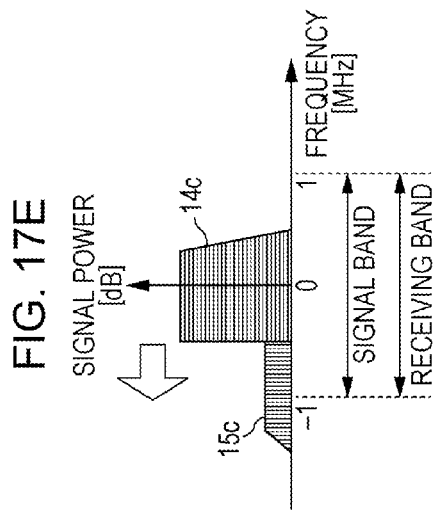
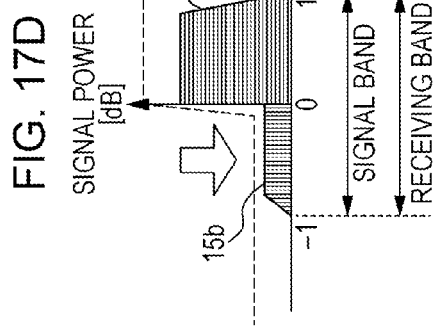

FIG. 18

| TRANSMISSION MODE OF RECEIVED SIGNAL | CORRELATION BETWEEN SIGNAL IN LOWER 1 MHz BAND ONLY AND SIGNAL IN HIGHER 1 MHz BAND ONLY |
|---|---|
| 1 MHz-U | SMALL |
| 1 MHz-L | SMALL |
| 1 MHz-D | LARGE |
| 2 MHz | SMALL |

WIRELESS COMMUNICATION DEVICE AND WIRELESS COMMUNICATION METHOD

BACKGROUND

1. Technical Field

The present disclosure relates to a wireless communication device and a wireless communication method.

2. Description of the Related Art

Heretofore, indoor communication has been the main target of the efforts of the wireless LAN standard in IEEE 802.11. Additional physical layer standards have followed, primarily with the aim of increasing transmission capacity, such as 802.11b (up to 11 Mbps), 802.11a/11g (up to 54 Mbps), 802.11n (up to 600 Mbps), and 802.11ac (up to 6.9 Gbps). Meanwhile, as the development of smart meters for realizing smart grids intensifies, demand is rising for low-rate, long-range outdoor transmission. Debate also continues over issues such as the allocation of usable frequencies for specified low-power wireless intended for such applications. Given this background, the formulation of a new communication standard using the sub-GHz band (the frequency band slightly lower than 1 GHz) is now being investigated. Additionally, in 2010, an IEEE 802.11 task group focused on developing a wireless LAN standard using the frequency band up to 1 GHz, TGah (802.11ah) was also formed. The specification framework for TGah (802.11ah) achieves a data rate of up to 100 kbps, and a maximum transmission range of 1 km.

In standards since IEEE 802.11a that use OFDM modulation schemes, including TGah (802.11ah), a preamble at the beginning of a packet is used to establish various synchronizations, and burst communication is conducted. The preamble is made up of a short training field (STF; also called the short preamble) and a long training field (LTF; also called the long preamble). The STF is used for automatic gain control (AGC), or automatic frequency control (AFC) to conduct rough adjustment. The LTF is used for AFC to conduct fine adjustment, or channel estimation. Also, after the preamble, there is placed SIGNAL information for controlling a data field (also designated "DATA"). The SIGNAL information is multiplexed by BPSK modulation that is strong against interference.

In TGah (802.11ah), it is anticipated that the standard will require a compatible communication device to be equipped with a function for communicating using the 1 MHz and 2 MHz signal bands. Consequently, in a communication network formed by communication devices conforming to 802.11ah, the formation of a communication network using both 1 MHz and 2 MHz as signal bands is anticipated. In other words, an environment of coexisting 1 MHz/2 MHz channels is anticipated.

Accordingly, when conducting communication based on 802.11ah, a communication device may need to determine whether a communication peer is transmitting using 1 MHz or 2 MHz as the signal band.

Similarly to 802.11ah, IEEE 802.11n is another standard that communicates by switching between multiple transmission modes within a communication network conforming to the same communication standard. Japanese Unexamined Patent Application Publication No. 2010-109401 discloses a method of efficiently determining the transmission mode (transmission format) in 802.11n.

SUMMARY

However, with the method in Japanese Unexamined Patent Application Publication No. 2010-109401, the transmission mode (transmission format) is identified on the basis of the SIGNAL information that is obtained last in the receiving process. For this reason, in Japanese Unexamined Patent Application Publication No. 2010-109401, there is a lengthy processing time to conduct the transmission mode determination process. Also, in Japanese Unexamined Patent Application Publication No. 2010-109401, reattempting a receiving operation requires storing all received data, and thus high-capacity memory is required. Additionally, the method in Japanese Unexamined Patent Application Publication No. 2010-109401 is a detection of the frame format in 802.11n, which cannot be applied directly to the determination of the transmission mode in 802.11ah.

Thus, a non-limiting exemplary embodiment of the present disclosure provides a wireless communication device and a wireless communication method able accurately detect the transmission mode and improve communication efficiency for communication based on IEEE 802.11ah.

A wireless communication device according to an embodiment of the present disclosure is provided with: a receiving unit that receives a signal using one of a plurality of transmission formats that use at least one of a first frequency band and a second frequency band; and a determination unit that determines a transmission format being used in the received signal from among the plurality of transmission formats, the determination unit comprising a pattern matching unit that stores a plurality of patterns respectively expressing a received waveform of a preamble in each of the plurality of transmission format, conducts a pattern matching between the received signal and each of the plurality of patterns, and obtains a correlation value, and a mode determination unit that determines the transmission format being used in the received signal on the basis of the obtained correlation value.

A wireless communication device according to an embodiment of the present disclosure is provided with: a receiving unit that receives a signal using one of a plurality of transmission formats that use at least one of a first frequency band and a second frequency band; and a determination unit that determines a transmission format being used in the received signal from among the plurality of transmission formats. The determination unit includes a first extraction unit that extracts a first component of the first frequency band from the received signal, a second extraction unit that extracts a second component of the second frequency band from the received signal, a pattern matching unit that stores a plurality of patterns respectively expressing a received waveform of a preamble in each of the plurality of transmission formats, conducts a first pattern matching between the first component of the received signal and a first pattern corresponding to a transmission format that uses the first frequency band, conducts a second pattern matching between the second component of the received signal and a second pattern corresponding to a transmission format that uses the second frequency band, conducts a third pattern matching between the received signal and a pattern corresponding to a transmission format that uses the first frequency band and the second frequency band, and obtains a correlation value, and a mode determination unit that determines a transmission format being used in the received signal on the basis of the correlation value.

A wireless communication device according to an embodiment of the present disclosure is provided with: a receiving unit that receives a signal using one of a plurality of transmission formats that use at least one of a first frequency band and a second frequency band; and a determination unit that determines a transmission format being used in the received signal from among the plurality of transmission formats. The determination unit comprises a first extraction unit that extracts a first component of the first frequency band from the received signal, a first power calculation unit that calculates a first power difference between the received signal and the first component, a second extraction unit that extracts a second component of the second frequency band from the received signal, a second power calculation unit that calculates a second power difference between the received signal and the second component, and a mode determination unit that determines the transmission format being used in the received signal based on a magnitude relationship between the first power difference and a predetermined value, and a magnitude relationship between the second power difference and the predetermined value.

A wireless communication device according to an embodiment of the present disclosure is provided with: a receiving unit that receives a signal using one of a plurality of transmission formats that use at least one of a first frequency band and a second frequency band; and a determination unit that determines a transmission format being used in the received signal from among the plurality of transmission formats. The determination unit includes a first extraction unit that extracts a first component of the first frequency band from the received signal, a first frequency shift unit that shifts the frequency of the first component toward higher frequency by half the width of the first frequency band, a second extraction unit that extracts a second component of the second frequency band from the received signal, a second frequency shift unit that shifts the frequency of the second component toward lower frequency by half the width of the second frequency band, a pattern matching unit that conducts a pattern matching between the frequency-shifted first component and the frequency-shifted second component, and obtains a correlation value, and a mode determination unit that determines a transmission format being used in the received signal on the basis of the correlation value.

A wireless communication device according to an embodiment of the present disclosure is provided with: a receiving unit that receives a signal that includes a short training field (STF) including a plurality of symbols, the received signal using one of a plurality of transmission formats that use at least one of a first frequency band and a second frequency band; and a determination unit that determines a transmission format being used in the received signal from among the plurality of transmission formats. The number of symbols in the STF of a second transmission format is half the number of symbols in the STF of a first transmission format. The determination unit comprises a delay unit that delays the received signal by a first time corresponding to the number of symbols in the STF of the second transmission format, and a mode determination unit configured so that, when a correlation value is high between the pre-delay received signal and the delayed received signal during a period from a time point after the first time elapses since the beginning of the pre-delay received signal to a time point after a time corresponding to half of the symbols elapses, the mode determination unit determines that a transmission format using one of either the first frequency band or the second frequency band is being used, and when the correlation value is low, determines that a transmission format using both the first frequency band and the second frequency band is being used.

A wireless communication device according to an embodiment of the present disclosure is provided with: a receiving unit that receives a signal that includes a long training field (LTF) in which pilot signals are multiplexed and a signal field in which control signals modulated by a modulation scheme using the same phase as, or a phase existing in an orthogonal relationship with, the phase in which the pilot signal is placed, are multiplexed, and the received signal using one of a plurality of transmission formats that use at least one of a first frequency band and a second frequency band; and a determination unit that determines a transmission format being used in the received signal from among the plurality of transmission formats by using a plurality of symbols, including symbols constituting the LTF and symbols constituting the signal field. The determination unit includes a differential computation unit that conducts a differential computation between neighboring symbols in the time domain on three symbols from a 2nd symbol to a 4th symbol starting from the beginning of the LTF from among the plurality of symbols, a square computation unit that computes the square of the differential computation result, and a mode determination unit that determines a transmission format being used in the received signal on the basis of whether a value indicating the squared result is a positive value or a negative value on the real axis.

A wireless communication device according to an embodiment of the present disclosure is provided with: a receiving unit that receives a signal that includes a long training field (LTF) in which pilot signals are multiplexed, the received signal using one of a plurality of transmission formats that use at least one of a first frequency band and a second frequency band; and a determination unit that uses symbols included in the LTF to determine a transmission format being used in the received signal from among the plurality of transmission formats. The determination unit includes a complex division unit that calculates an estimated channel state value for each of the plurality of transmission formats by complexly dividing a first symbol and a second symbol starting from the beginning of the LTF by a pilot pattern corresponding to each of the plurality of transmission formats, a symbol filter that filters each estimated channel state value in the symbol direction, a carrier filter that filters, in the carrier direction, each estimated channel state value filtered in the symbol direction, a power calculation unit that calculates a power value for each of the plurality of transmission formats using the estimated channel state value filtered in the carrier direction, and a mode determination unit that determines that the transmission format with the greatest power value is being used in the received signal.

These general and specific aspects may be implemented using a system, a method, and a computer program, and any combination of systems, methods, and computer programs.

According to the present disclosure, it is possible to accurately detect the transmission mode and improve communication efficiency for communication based on IEEE 802.11ah. Additional benefits and advantages of the disclosed embodiments will be apparent from the specification and Figures. The benefits and/or advantages may be individually provided by the various embodiments and features of the specification and Figures, and need not all be provided in order to obtain one or more of the same.

BRIEF DESCRIPTION OF THE DRAWINGS

FIG. 3 is a block diagram illustrating a configuration of a wireless communication device according to Embodiment 1 of the present disclosure;

FIGS. 8A to 8D are diagrams illustrating a band restriction process according to Embodiment 2 of the present disclosure;

FIGS. 10A to 10C are diagrams illustrating a band restriction process according to Embodiment 3 of the present disclosure (for the case of placement mode 1L);

FIGS. 12A to 12C are diagrams illustrating a band restriction process according to Embodiment 3 of the present disclosure (for the case of placement mode 1D);

FIGS. 13A to 13C are diagrams illustrating a band restriction process according to Embodiment 3 of the present disclosure (for the case of placement mode 2C);

FIG. 14 is a diagram illustrating correspondence relationships between signal power difference and transmission mode according to Embodiment 3 of the present disclosure;

FIG. 16A is a diagram illustrating a signal spectrum of placement mode 1D;

FIGS. 16B to 16E are diagrams illustrating a band restriction and frequency shift process according to Embodiment 4 of the present disclosure (for the case of placement mode 1D);

FIG. 17A is a diagram illustrating a signal spectrum of placement mode 2C;

FIGS. 17B to 17E are diagrams illustrating a band restriction and frequency shift process according to Embodiment 4 of the present disclosure (for the case of placement mode 2C);

FIG. 18 is a diagram illustrating correspondence relationships between correlation value and transmission mode according to Embodiment 4 of the present disclosure;

DETAILED DESCRIPTION

Hereinafter, exemplary embodiments of the present disclosure will be described in detail and with reference to the drawings.

[Transmission Format]

Figure 1:
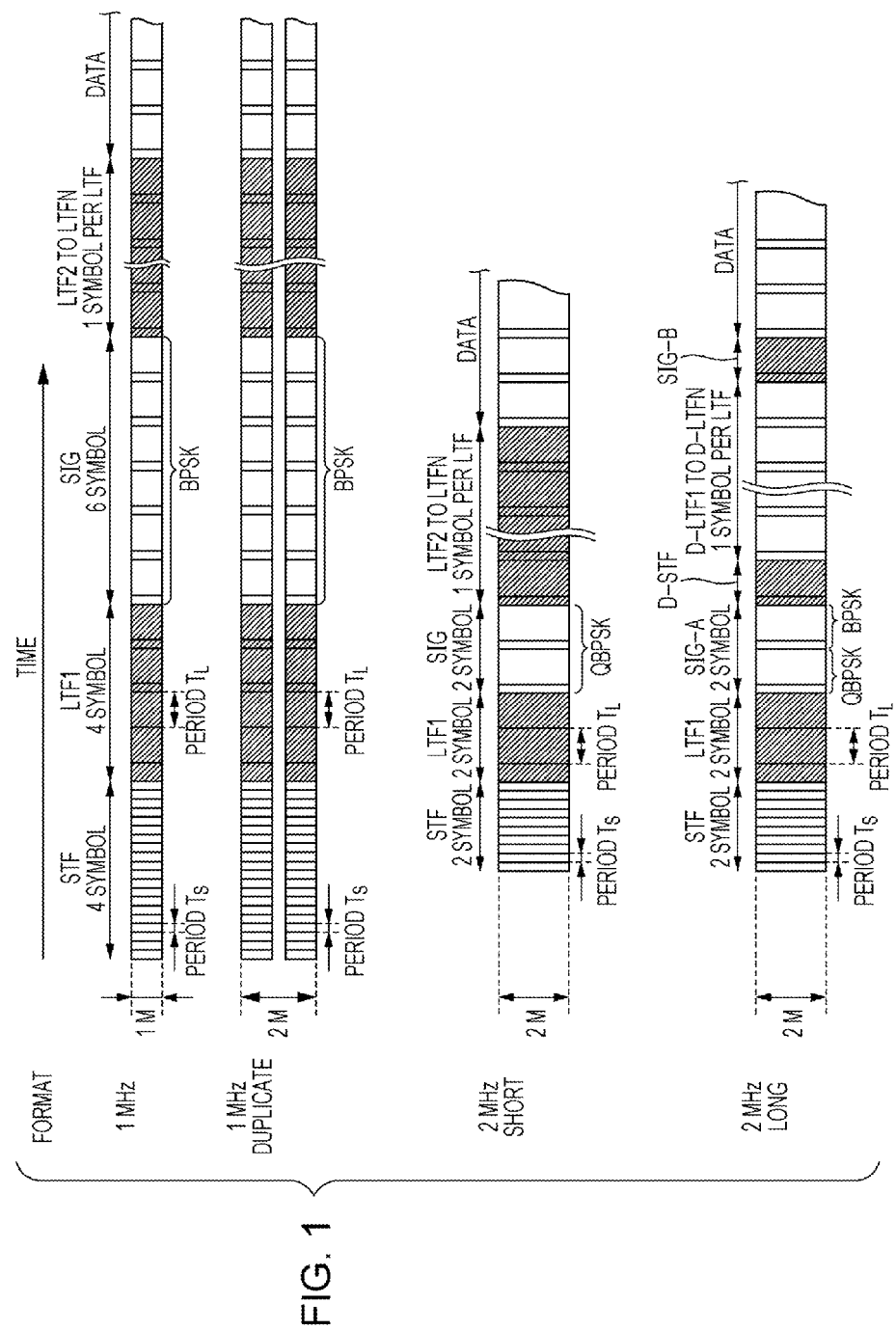
FIG. 1 is a diagram illustrating transmission formats of the 1 MHz/2 MHz bands in 802.11 ah.

FIG. 1 illustrates transmission formats (signal transmission modes) used in 802.11ah. In FIG. 1, the horizontal axis represents the time domain, while the vertical axis represents the frequency domain.

Transmission formats are roughly divided into four types. Specifically, these types are the 1 MHz format, the 1 MHz Duplicate format (also called Duplicate mode), the 2 MHz short format, and the 2 MHz long format.

Specifically, the 1 MHz format uses the 1 MHz bandwidth, and is made up of the STF, LTF1, SIG, LTF2 to LTFN, and DATA.

The 1 MHz Duplicate format uses the 2 MHz band to multiplex two of the same 1 MHz frame packets.

The 2 MHz short format uses the 2 MHz bandwidth. The 2 MHz short format is made up of the STF, LTF1, SIG, LTF2 to LTFN, and DATA.

The 2 MHz long format uses the 2 MHz bandwidth. The 2 MHz long format is made up of the STF, LTF1, SIG-A, D-STF, D-LTF1 to D-LTFN, SIG-B, and DATA.

Also, as illustrated in FIG. 1, each transmission format is made up of a time-division multiplexed preamble (STF and LTF), signal field (SIG), and data field (DATA). In the signal field (SIG), control information for the data field (SIGNAL information) is multiplexed. In the data field (DATA), the data (payload) is multiplexed.

In the STF at the beginning, a fixed pattern of short training symbols (STS) with a period of $T_S$ are repeatedly placed 20 times in the 1 MHz format, and 10 times in the 2 MHz format. In other words, the number of STS in the 2 MHz format is half the number of STS in the 1 MHz format. The STF is used for AGC, rough AFC, or packet detection.

In the LTF following the STF, a fixed pattern of long training symbols (LTS) with a period of $T_L$ are repeatedly placed four times in the 1 MHz format, and two times in the 2 MHz format. In other words, the number of LTS in the 2 MHz format is half the number of LTS in the 1 MHz format. Also, a guard interval of a long preamble portion is added at the beginning of the LTF or among the LTS.

After the LTF, the signal field (SIG) that transmits information for demodulating the payload portion (such as the modulation scheme) is placed, and after that, the payload (DATA) is placed.

Figure 2:
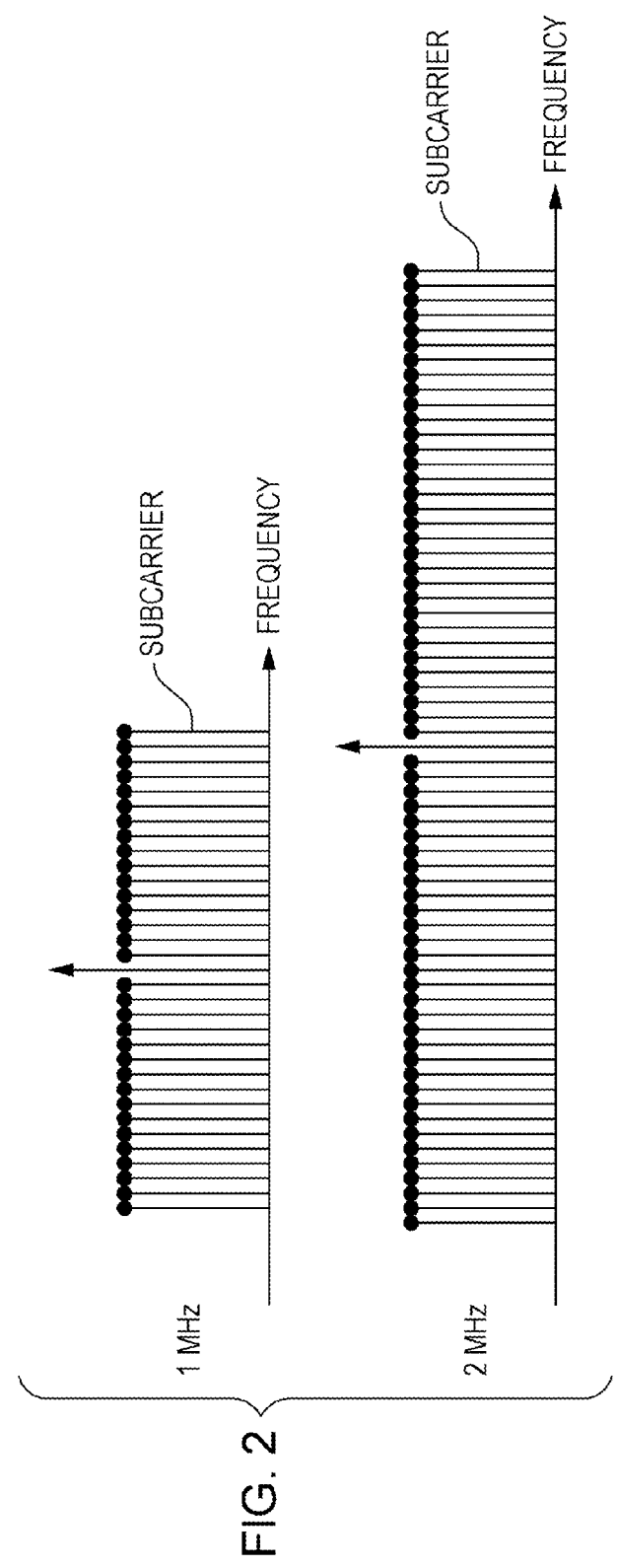
FIG. 2 is a diagram illustrating an example of subcarrier arrangement in the 1 MHz/2 MHz signal spectra.

Also, in 802.11ah, signals are modulated by OFDM. As illustrated in FIG. 2, there are placed subcarriers mapped in the frequency domain using phase-shift keying (PSK) or quadrature amplitude modulation (QAM).

Embodiment 1

[Configuration of Wireless Communication Device 100]

FIG. 3 is a block diagram illustrating a configuration of a wireless communication device 100 according to the present embodiment. The wireless communication device 100 is a communication device that conducts communication conforming to 802.11ah, for example. FIG. 3 illustrates a configuration of a circuit in the wireless communication device 100 that conducts a receiving process in the physical layer.

The wireless communication device 100 illustrated in FIG. 3 includes a tuner 101, a determination unit 102, a synchronization unit 103, a fast Fourier transform (FFT) unit 104, an equalization unit 105, and an error correction unit 106.

The tuner 101 conducts channel selection to synchronize with the frequency band being used for wireless communication. During the channel selection process, when it is unknown whether the peer communication device communicating with the wireless communication device 100 is transmitting signals using 1 MHz or 2 MHz, the tuner 101 sets the receive band to 2 MHz and conducts the receiving process.

Figure 4A:
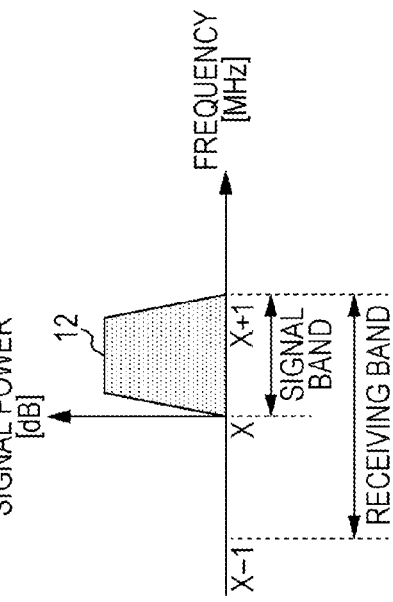
FIGS. 4A to 4D are diagrams illustrating examples of 1 MHz/2 MHz signal spectra in the case of setting the signal receiving band to 2 MHz.
Figure 4B:
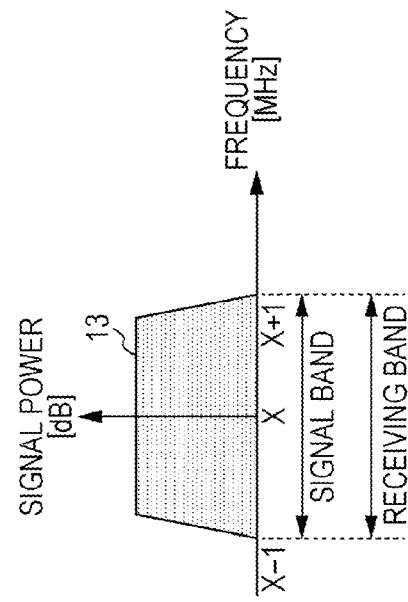
Figure 4C:
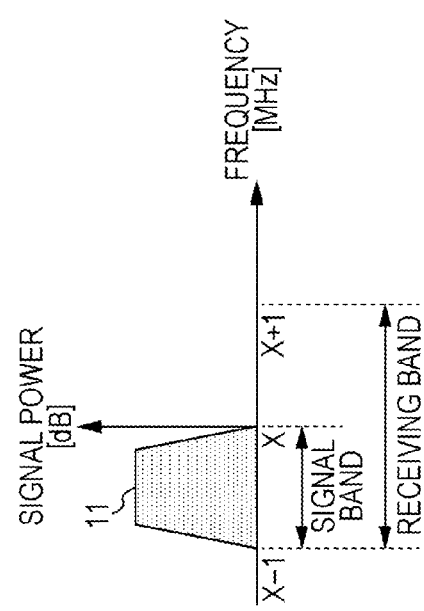
Figure 4D:
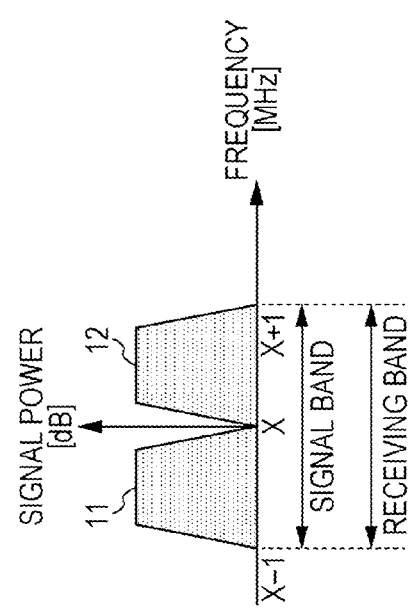

FIGS. 4A to 4D illustrate the spectral placement of signals (OFDM signals) conforming to 802.11ah in received signals received by the tuner 101. As illustrated in FIGS. 4A to 4D, in 802.11ah, four types of spectral placement modes are envisioned. Specifically, FIG. 4A illustrates a case in which an OFDM signal 11 is placed in the 1 MHz band on the low-frequency side (hereinafter also called the lower band) included in the 2 MHz band (hereinafter, this placement is also designated "1L"). FIG. 4B illustrates a case in which an OFDM signal 12 is placed in the 1 MHz band on the high-frequency side (hereinafter also called the higher band) included in the 2 MHz band (hereinafter, this placement is also designated "1U"). FIG. 4C illustrates the case of Duplicate mode, in which the OFDM signal 11 is placed in the lower 1 MHz band within the 2 MHz band, and an OFDM signal 12 identical to the OFDM signal 11 is placed in the higher 1 MHz band (hereinafter, this placement is also designated "1D"). FIG. 4D illustrates a case in which a 2 MHz band OFDM signal 13 is placed in the 2 MHz band (hereinafter, this placement is also designated "2C"). In other words, FIGS. 4A and 4B correspond to the 1 MHz format that uses either one of two bands, while FIG. 4C corresponds to the 1 MHz Duplicate format that uses two bands, and FIG. 4D corresponds to the 2 MHz (short/long) format that uses two bands. A received signal is transmitted using any one of the above transmission formats.

The determination unit 102 determines the transmission mode (transmission format) of the received signal by using the interval corresponding to the preamble (STF, LTF) in a received signal received from the tuner 101. Note that a detailed description of the transmission mode determination process by the determination unit 102 will be given later.

The synchronization unit 103, the FFT unit 104, the equalization unit 105, and the error correction unit 106 conduct the following various processes in accordance with the transmission mode (transmission format) determined by the determination unit 102.

The synchronization unit 103 detects the timings at which to conduct an FFT process by using the preamble in the 802.11ah frame inside the received signal received from the tuner 101.

The FFT unit 104 conducts an FFT process on the received signal at the timings detected by the synchronization unit 103.

The equalization unit 105 conducts an equalization process on the FFT-processed signal.

The error correction unit 106 conducts an error correction process on the equalized signal.

[Operation of Determination Unit 102]

Next, a transmission mode determination method used by the determination unit 102 of the wireless communication device 100 illustrated in FIG. 3 will be described in detail.

Figure 5:
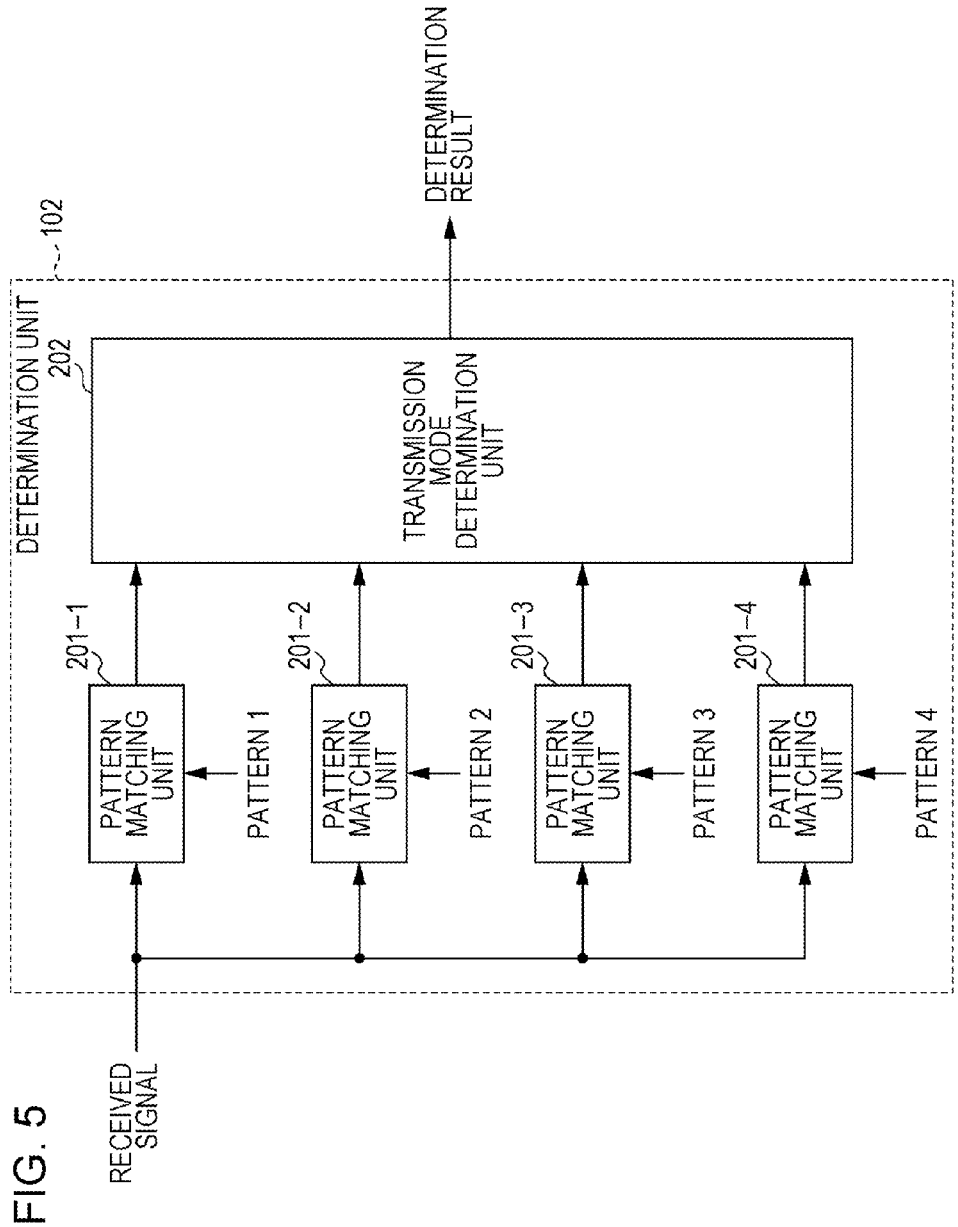
FIG. 5 is a block diagram illustrating an internal configuration of a determination unit according to Embodiment 1 of the present disclosure.

FIG. 5 is a block diagram illustrating an internal configuration of the determination unit 102.

The determination unit 102 illustrated in FIG. 5 includes pattern matching units 201-1 to 201-4, and a transmission mode determination unit 202.

The pattern matching units 201-1 to 201-4 respectively correspond to the four types of spectral placement modes (1L, 1U, 1D, 2C) illustrated in FIG. 4. The pattern matching units 201-1 to 201-4 store patterns (preamble patterns 1 to 4) in advance that express the received waveform of the preamble (STF, LTF) in a corresponding spectral placement mode. The pattern matching units 201-1 to 201-4 conduct a pattern-matching process on the received signal received from the tuner 101 and the stored preamble patterns, and output pattern matching results (correlation values) to the transmission mode determination unit 202.

The transmission mode determination unit 202 uses the pattern matching results received from each of the pattern matching units 201-1 to 201-4 to determine the spectral placement mode being used in the received signal. In other words, the transmission mode determination unit 202 determines that the transmission format (spectral placement mode) corresponding to the preamble pattern having the highest correlation with the received signal is being used in the received signal. The transmission mode determination unit 202 outputs the transmission mode (placement mode) resulting from the determination to each of the synchronization unit 103, the FFT unit 104, the equalization unit 105, and the error correction unit 106.

Figure 6:
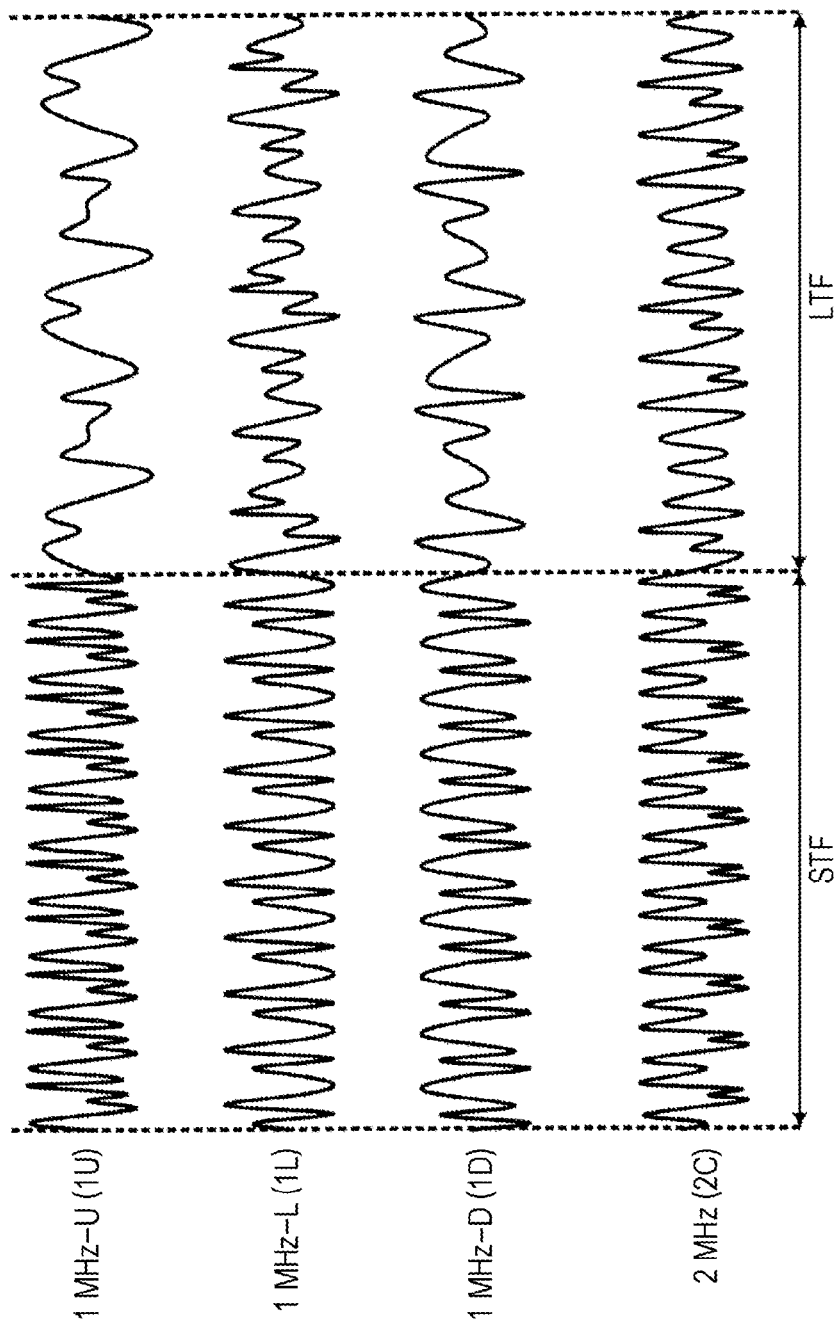
FIG. 6 is a diagram illustrating an example of received waveform patterns of preambles according to Embodiment 1 of the present disclosure.

FIG. 6 illustrates an example of received signal waveforms of the preambles (STF and LTF) corresponding to each of the spectral placement modes illustrated in FIGS. 4A to 4D.

As illustrated in FIG. 6, differences occur in the preamble patterns depending on the spectral placement mode. This means that even though the transmitting side transmits the same signal as the preamble, the pattern of the preamble on the receiving side differs according to the spectral placement illustrated in FIGS. 4A to 4D.

In other words, in the determination unit 102, the transmission mode may be determined by identifying which of the mutually different preamble patterns matches the waveform of the preamble in the received signal.

In so doing, in the wireless communication device 100, it is possible to identify the transmission mode before conducting the various receiving processes (the processes of the synchronization unit 103, the FFT unit 104, the equalization unit 105, and the error correction unit 106). Consequently, according to the present embodiment, a lengthy processing time for conducting the transmission mode determination process may be avoided.

Furthermore, according to the present embodiment, since the transmission mode is determined before conducting receiving processes, it is not necessary to store all received data in the case of reattempting a receiving operation as in Japanese Unexamined Patent Application Publication No. 2010-109401, and thus high-capacity memory is not required.

Consequently, according to the present embodiment, it is possible to accurately detect the transmission mode and improve communication efficiency for communication based on IEEE 802.11ah.

Embodiment 2

In the present embodiment, the operation of the determination unit of the wireless communication device 100 (FIG. 3) differs compared to Embodiment 1.

Figure 7:
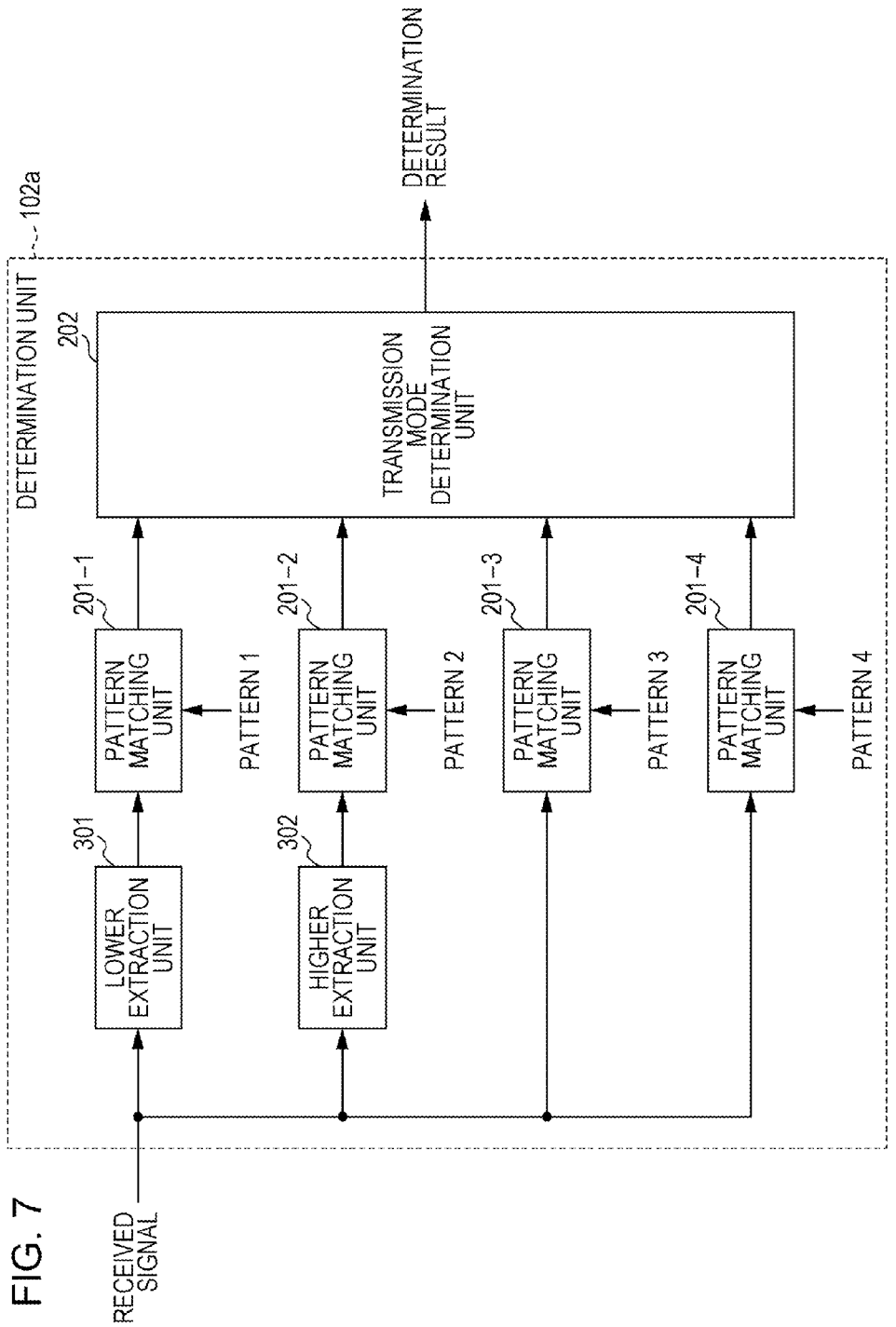
FIG. 7 is a block diagram illustrating an internal configuration of a determination unit according to Embodiment 2 of the present disclosure.

FIG. 7 is a block diagram illustrating an internal configuration of a determination unit 102a according to the present embodiment. Note that in FIG. 7, the same signs are given to components that conduct the same processes as Embodiment 1 (FIG. 5), and description thereof will be reduced or omitted.

In the determination unit 102a illustrated in FIG. 7, a lower extraction unit 301 extracts the lower 1 MHz signal from the received signal in the 2 MHz band by applying a band limit that allows the component of the lower 1 MHz band to pass through. The lower extraction unit 301 outputs the extracted signal to the pattern matching unit 201-1.

A higher extraction unit 302 extracts the higher 1 MHz signal from the received signal in the 2 MHz band by applying a band limit that allows the component of the higher 1 MHz band to pass through. The higher extraction unit 302 outputs the extracted signal to the pattern matching unit 201-2.

In the present embodiment, the pattern matching unit 201-1 corresponds to the spectral placement mode 1L (see FIG. 4A), while the pattern matching unit 201-2 corresponds to the spectral placement mode 1U (see FIG. 4B). Also, the pattern matching units 201-3 and 201-4 respectively correspond to either of the spectral placement modes 1D and 2C.

Similarly to Embodiment 1, the pattern matching units 201-1 to 201-4 conduct a pattern matching process on the input signal. In other words, the pattern matching unit 201-1 conducts a pattern matching process on the signal of the lower 1 MHz band and a preamble pattern corresponding to the placement mode 1L. Also, the pattern matching unit 201-2 conducts a pattern matching process on the signal of the higher 1 MHz band and a preamble pattern corresponding to the placement mode 1U.

FIGS. 8A to 8D are diagrams illustrating operation of the lower extraction unit 301 and the higher extraction unit 302 according to the present embodiment.

FIG. 8A illustrates the frequency spectrum of the received signal in the case of using the spectral placement mode 1L. In FIG. 8A, the desired OFDM signal 11 is included in the lower 1 MHz band (signal band), while a noise component 21 is included in the higher 1 MHz band.

Meanwhile, as illustrated in FIG. 8B, the lower extraction unit 301 applies a band limit 51 that allows the lower 1 MHz band to pass through. Consequently, as illustrated in FIG. 8B, the OFDM signal 11 in the lower 1 MHz signal band passes through as-is, whereas in the higher 1 MHz band, the noise component 21 is suppressed to become a noise component 22.

Thus, the pattern matching unit 201-1 is able to conduct a pattern matching process on a received signal in which band components other than the anticipated signal band (1L) are suppressed, and the preamble pattern of the placement mode 1L. As a result, the accuracy of pattern matching related to the placement mode 1L by the pattern matching unit 201-1 may be improved.

Similarly, FIG. 8C illustrates the frequency spectrum of the received signal in the case of using the spectral placement mode 1U. In FIG. 8C, the desired OFDM signal 12 is included in the higher 1 MHz band (signal band), while a noise component 23 is included in the lower 1 MHz band.

Meanwhile, as illustrated in FIG. 8D, the higher extraction unit 302 applies a band limit 52 that allows the higher 1 MHz band to pass through. Consequently, as illustrated in FIG. 8D, the OFDM signal 12 in the higher 1 MHz signal band passes through as-is, whereas in the lower 1 MHz band, the noise component 23 is suppressed to become a noise component 24.

Thus, the pattern matching unit 201-2 is able to conduct a pattern matching process on a received signal in which band components other than the anticipated signal band (1U) are suppressed, and the preamble pattern of the placement mode 1U. As a result, the accuracy of pattern matching related to the placement mode 1U by the pattern matching unit 201-2 may be improved.

As above, according to the present embodiment, it is possible to accurately detect the transmission mode and improve communication efficiency for communication based on IEEE 802.11ah, similarly to Embodiment 1. In addition, according to the present embodiment, the determination unit 102a is able to accurately conduct a pattern matching process even though a noise component is included in the received signal. Consequently, the transmission mode (placement mode) determination accuracy may be further improved compared to Embodiment 1.

Embodiment 3

In the present embodiment, the operation of the determination unit of the wireless communication device 100 (FIG. 3) differs compared to Embodiment 1 or 2.

Figure 9:
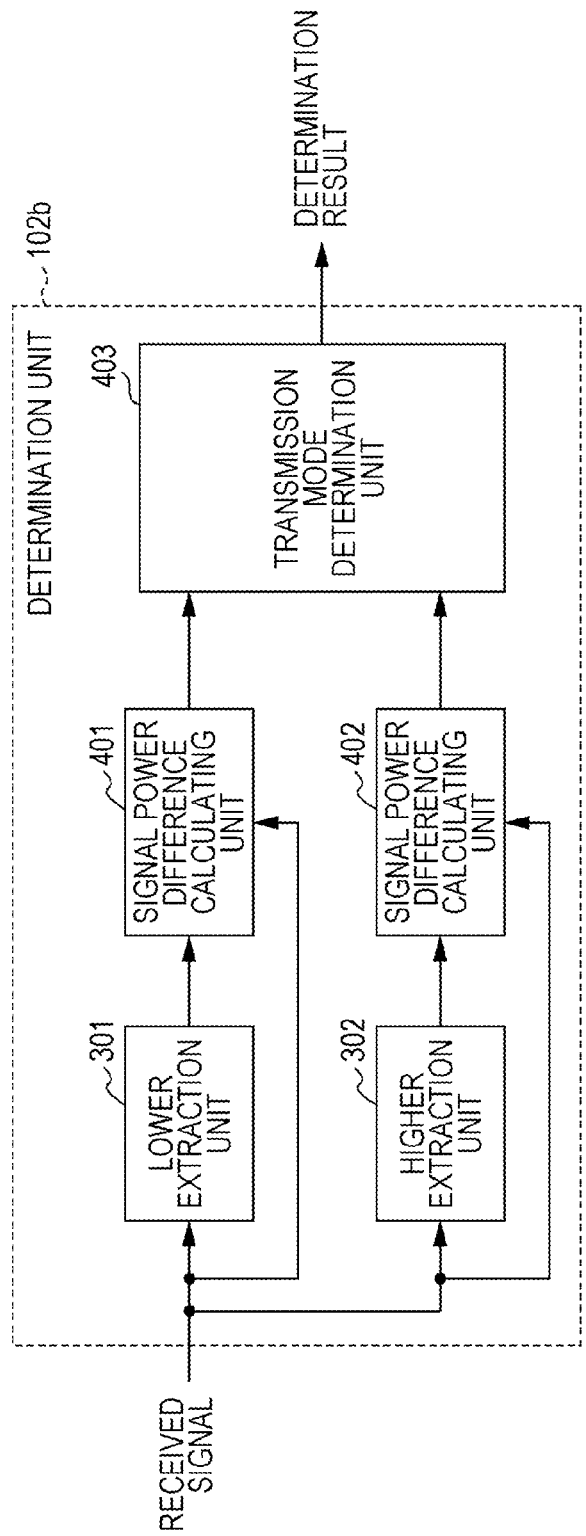
FIG. 9 is a block diagram illustrating an internal configuration of a determination unit according to Embodiment 3 of the present disclosure.

FIG. 9 is a block diagram illustrating an internal configuration of a determination unit 102b according to the present embodiment. Note that in FIG. 9, the same signs are given to components that conduct the same processes as Embodiment 2 (FIG. 7), and description thereof will be reduced or omitted.

In the determination unit 102b illustrated in FIG. 9, a signal power difference calculating unit 401 calculates the signal power difference between the received signal received from the lower extraction unit 301 (the band-limited (lower 1 MHz band) signal), and the received signal received from the tuner 101 (the 2 MHz band signal before band limiting).

A signal power difference calculating unit 402 calculates the signal power difference between the received signal received from the higher extraction unit 302 (the band-limited (higher 1 MHz band) signal), and the received signal received from the tuner 101 (the 2 MHz band signal before band limiting).

A transmission mode determination unit 403 makes a determination of the transmission mode (spectral placement mode) being used in the received signal on the basis of the combination of the signal power difference received from the signal power difference calculating unit 401 and the signal power difference received from the signal power difference calculating unit 402. In other words, the transmission mode determination unit 403 determines the transmission mode being used in the received signal on the basis of a magnitude relationship between the signal power difference received from the signal power difference calculating unit 401 and a threshold value, and a magnitude relationship between the signal power difference received from the signal power difference calculating unit 402 and a threshold value.

Hereinafter, operation of the transmission mode determination process by the determination unit 102b will be described in detail.

<Spectral Placement Mode 1L>

FIGS. 10A to 10C illustrate how the frequency spectrum changes in the determination unit 102b in the case of receiving a signal in the spectral placement mode 1L.

FIG. 10A illustrates the signal spectrum of a signal in the spectral placement mode 1L (the signal before band limiting).

FIG. 10B illustrates the signal spectrum after the lower extraction unit 301 applies the band limit 51 (band-limited signal). As illustrated in FIG. 10B, since the OFDM signal 11 is placed in the lower 1 MHz band (in the passband of the band limit 51), the signal component passes through without being suppressed. In this way, since the signal component is nearly the same before and after the band limiting, in the signal power difference calculating unit 401, the power difference between the signals before and after band limiting (FIGS. 10A and 10B) is small.

FIG. 10C illustrates the signal spectrum after the higher extraction unit 302 applies the band limit 52 (band-limited signal). As illustrated in FIG. 10C, since the OFDM signal 11 is placed in the lower 1 MHz band (outside the passband of the band limit 52), the signal component is suppressed to become a signal 11a. In this way, since the signal power of the signal component decreases after the band limiting, in the signal power difference calculating unit 402, the power difference between the signals before and after band limiting (FIGS. 10A and 10C) is large.

<Spectral Placement Mode 1U>

Figure 11B:
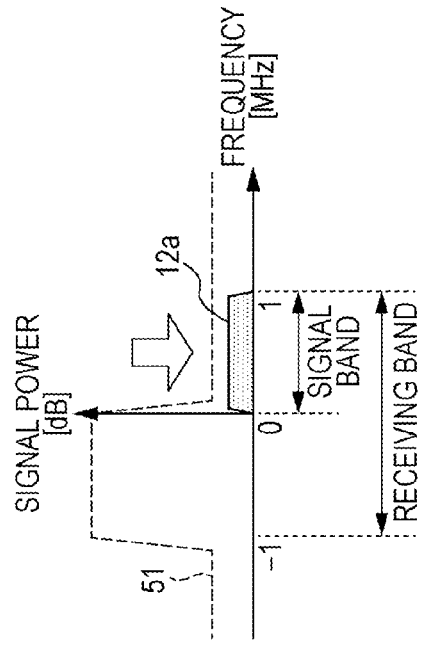
FIGS. 11A to 11C are diagrams illustrating a band restriction process according to Embodiment 3 of the present disclosure (for the case of placement mode 1U)
Figure 11A:
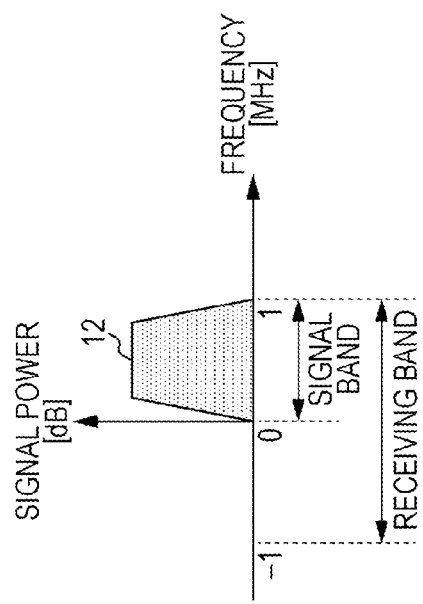
Figure 11C:
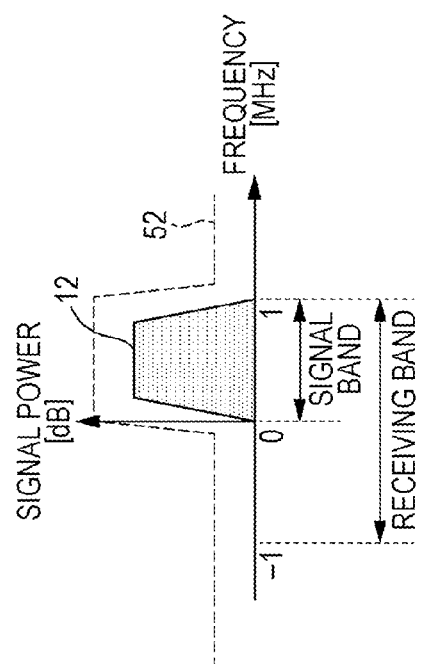

FIGS. 11A to 11C illustrate how the frequency spectrum changes in the determination unit 102b in the case of receiving a signal in the spectral placement mode 1U.

FIG. 11A illustrates the signal spectrum of a signal in the spectral placement mode 1U (the signal before band limiting).

FIG. 11B illustrates the signal spectrum after the lower extraction unit 301 applies the band limit 51 (band-limited signal). As illustrated in FIG. 11B, since the OFDM signal 12 is placed in the higher 1 MHz band (outside the passband of the band limit 51), the signal component is suppressed to become a signal 12a. In this way, since the signal power of the signal component decreases after the band limiting, in the signal power difference calculating unit 401, the power difference between the signals before and after band limiting (FIGS. 11A and 11B) is large.

FIG. 11C illustrates the signal spectrum after the higher extraction unit 302 applies the band limit 52 (band-limited signal). As illustrated in FIG. 11C, since the OFDM signal 12 is placed in the higher 1 MHz band (in the passband of the band limit 52), the signal component passes through without being suppressed. In this way, since the signal component is nearly the same before and after the band limiting, in the signal power difference calculating unit 402, the power difference between the signals before and after band limiting (FIGS. 11A and 11C) is small.

<Spectral Placement Mode 1D>

FIGS. 12A to 12C illustrate how the frequency spectrum changes in the determination unit 102b in the case of receiving a signal in the spectral placement mode 1D.

FIG. 12A illustrates the signal spectrum of a signal in the spectral placement mode 1D (the signal before band limiting).

FIG. 12B illustrates the signal spectrum after the lower extraction unit 301 applies the band limit 51 (band-limited signal). As illustrated in FIG. 12B, since the OFDM signal 11 placed in the lower 1 MHz band is placed in the passband of the band limit 51, the signal component passes through without being suppressed. On the other hand, since the OFDM signal 12 placed in the higher 1 MHz band is placed outside the passband of the band limit 51, the signal component is suppressed to become a signal 12b. In this way, since the signal power of the signal component in the higher 1 MHz band decreases after the band limiting, in the signal power difference calculating unit 401, the power difference between the signals before and after band limiting (FIGS. 12A and 12B) is large.

FIG. 12C illustrates the signal spectrum after the higher extraction unit 302 applies the band limit 52 (band-limited signal). As illustrated in FIG. 12C, since the OFDM signal 11 placed in the lower 1 MHz band is placed outside the passband of the band limit 52, the signal component is suppressed to become a signal 11b. On the other hand, since the OFDM signal 12 placed in the higher 1 MHz band is placed in the passband of the band limit 52, the signal component passes through without being suppressed. In this way, since the signal power of the signal component in the lower 1 MHz band decreases after the band limiting, in the signal power difference calculating unit 402, the power difference between the signals before and after band limiting (FIGS. 12A and 12C) is large.

<Spectral Placement Mode 2C>

FIGS. 13A to 13C illustrate how the frequency spectrum changes in the determination unit 102b in the case of receiving a signal in the spectral placement mode 2C.

FIG. 13A illustrates the signal spectrum of a signal in the spectral placement mode 2C (the signal before band limiting).

FIG. 13B illustrates the signal spectrum after the lower extraction unit 301 applies the band limit 51 (band-limited signal). As illustrated in FIG. 13B, since the signal component 13a of the OFDM signal 13 placed in the lower 1 MHz band is placed in the passband of the band limit 51, the signal component passes through without being suppressed. On the other hand, since the signal component 13b of the OFDM signal 13 placed in the higher 1 MHz band is placed outside the passband of the band limit 51, the signal component is suppressed. In this way, since the signal power of the signal component 13b in the higher 1 MHz band decreases after the band limiting, in the signal power difference calculating unit 401, the power difference between the signals before and after band limiting (FIGS. 13A and 13B) is large.

FIG. 13C illustrates the signal spectrum after the higher extraction unit 302 applies the band limit 52 (band-limited signal). As illustrated in FIG. 13C, since the signal component 13d of the OFDM signal 13 placed in the lower 1 MHz band is placed outside the passband of the band limit 52, the signal component is suppressed. On the other hand, since the signal component 13c of the OFDM signal 13 placed in the higher 1 MHz band is placed in the passband of the band limit 52, the signal component passes through without being suppressed. In this way, since the signal power of the signal component 13d in the lower 1 MHz band decreases after the band limiting, in the signal power difference calculating unit 402, the power difference between the signals before and after band limiting (FIGS. 13A and 13C) is large.

The correspondence relationships illustrated in FIG. 14 summarize the combinations of signal power differences before and after band limiting in the higher 1 MHz band and the lower 1 MHz band for each of the received signals in the spectral placement modes 1L, 1U, 1D, and 1C described above. For example, in FIG. 14, "small" indicates that the signal power difference is less than a threshold value, while "large" indicates that the signal power difference is equal to or greater than a threshold value.

The transmission mode determination unit 403 determines the transmission mode (spectral placement mode) of the received signal on the basis of the combination of the signal power differences received from the signal power difference calculating units 401 and 402, that is, on the basis of the correspondence relationships illustrated in FIG. 14.

For example, when the signal power difference of the lower 1 MHz across the band limit 51 is "small", and the signal power difference of the higher 1 MHz band across the band limit 52 is "large", the transmission mode determination unit 403 determines that the transmission format using the higher 1 MHz band (1U) is being used. Similarly, when the signal power difference of the lower 1 MHz across the band limit 51 is "large", and the signal power difference of the higher 1 MHz band across the band limit 52 is "small", the transmission mode determination unit 403 determines that the transmission format using the lower 1 MHz band (1L) is being used.

Also, when the signal power difference of the lower 1 MHz across the band limit 51 is "large", and the signal power difference of the higher 1 MHz band across the band limit 52 is "large", the transmission mode determination unit 403 determines that a transmission format using the 2 MHz band (1D or 2C) is being used.

In other words, as illustrated in FIG. 14, the transmission mode determination unit 403 is able to determine the transmission mode while distinguishing between the transmission formats (spectral placement modes) 1U, 1L, and 1D or 2C. In other words, the transmission mode determination unit 403 is able to determine the bandwidth of the received signal (1 MHz or 2 MHz), and the band in which a 1 MHz band received signal is placed (higher 1 MHz or lower 1 MHz).

As above, according to the present embodiment, the determination unit 102b is able to use signal power differences before and after band limiting to accurately detect the transmission mode (placement mode), and improve communication efficiency.

For example, by applying the transmission mode determination method according to the present embodiment, a terminal device that supports 1 MHz formats (1U and 1L) is able to accurately determine the two transmission modes.

Embodiment 4

In the present embodiment, the operation of the determination unit of the wireless communication device 100 (FIG. 3) differs compared to Embodiments 1 to 3.

Figure 15:
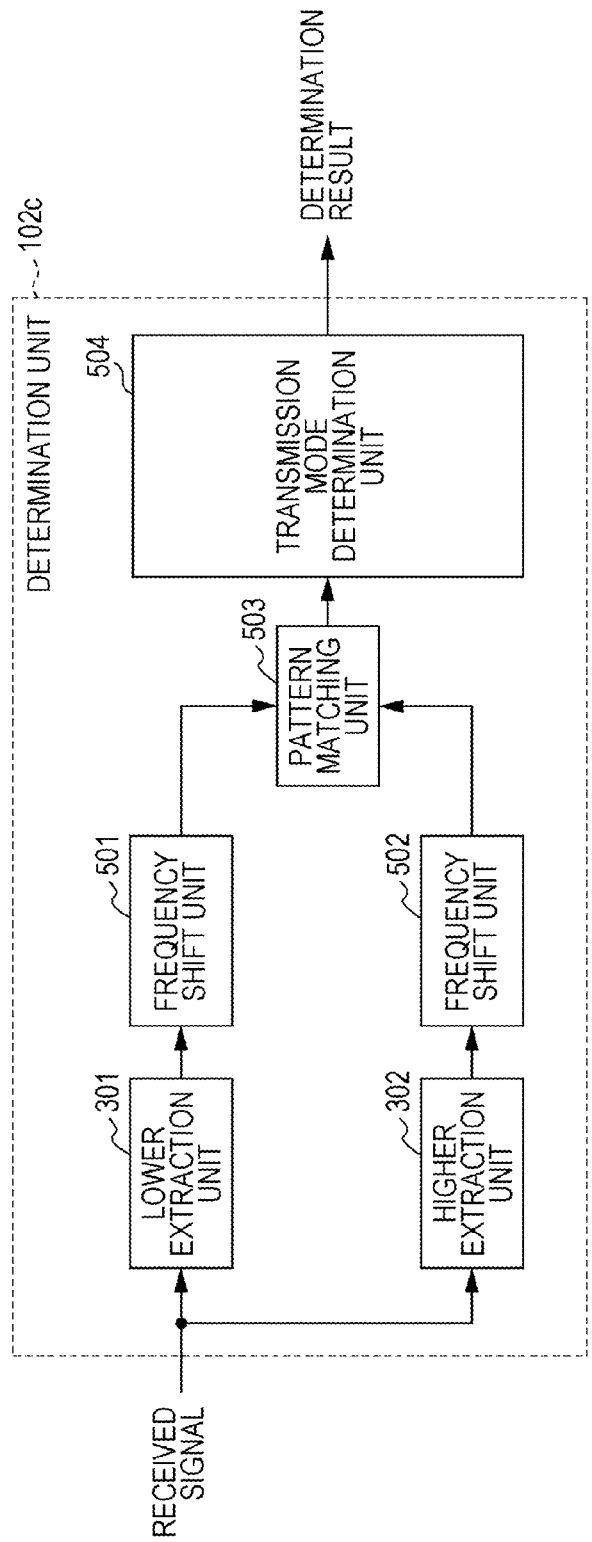
FIG. 15 is a block diagram illustrating an internal configuration of a determination unit according to Embodiment 4 of the present disclosure.

FIG. 15 is a block diagram illustrating an internal configuration of a determination unit 102c according to the present embodiment. Note that in FIG. 15, the same signs are given to components that conduct the same processes as Embodiment 2 (FIG. 7), and description thereof will be reduced or omitted.

In the determination unit 102c illustrated in FIG. 15, a frequency shift unit 501 shifts by +0.5 MHz the frequency of the signal received from the lower extraction unit 301 (the signal after the band limit that passes the lower 1 MHz band). In other words, the band-limited signal is frequency-shifted toward higher frequency by half (0.5 MHz) of the lower 1 MHz band.

A frequency shift unit 502 shifts by −0.5 MHz the frequency of the signal received from the higher extraction unit 302 (the signal after the band limit that passes the higher 1 MHz band). In other words, the band-limited signal is frequency-shifted toward lower frequency by half (0.5 MHz) of the higher 1 MHz band.

A pattern matching unit 503 conducts a pattern matching process (correlation process) on the signal received from the frequency shift unit 501 and the signal received from the frequency shift unit 502, and obtains a correlation value.

A transmission mode determination unit 504 uses the pattern matching result (correlation value) received from the pattern matching unit 503 to determine the transmission mode (spectral placement mode) being used in the received signal.

Hereinafter, operation of the transmission mode determination process by the determination unit 102c will be described in detail.

<Spectral Placement Mode 1D>

FIGS. 16A to 16E illustrate how the frequency spectrum changes in the determination unit 102c in the case of receiving a signal in the spectral placement mode 1D.

FIG. 16A illustrates the signal spectrum of a signal in the spectral placement mode 1D.

FIG. 16B illustrates the signal spectrum after the lower extraction unit 301 applies the band limit 51. As illustrated in FIG. 16B, since the OFDM signal 11 placed in the lower 1 MHz band is placed in the passband of the band limit 51, the signal component passes through without being suppressed. On the other hand, since the OFDM signal 12 placed in the higher 1 MHz band is placed outside the passband of the band limit 51, the signal component is suppressed to become a signal 12c. FIG. 16C illustrates how the frequency shift unit 501 shifts the frequency of the signal illustrated in FIG. 16B by +0.5 MHz. As illustrated in FIG. 16C, the signal in the lower 1 MHz band is frequency-shifted by +0.5 MHz to become a signal 11c, while the signal in the higher 1 MHz band is frequency-shifted by +0.5 MHz to become a signal 12d. As a result, the signal in the lower 1 MHz band illustrated in FIG. 16B becomes centered on a frequency of 0 (MHz) in FIG. 16C.

FIG. 16D illustrates the signal spectrum after the higher extraction unit 302 applies the band limit 52. As illustrated in FIG. 16D, since the OFDM signal 11 placed in the lower 1 MHz band is placed outside the passband of the band limit 52, the signal component is suppressed to become a signal 11d. On the other hand, since the OFDM signal 12 placed in the higher 1 MHz band is placed in the passband of the band limit 52, the signal component passes through without being suppressed. FIG. 16E illustrates how the frequency shift unit 502 shifts the frequency of the signal illustrated in FIG. 16D by −0.5 MHz. As illustrated in FIG. 16E, the signal in the lower 1 MHz band is frequency-shifted by −0.5 MHz to become a signal 11e, while the signal in the higher 1 MHz band is frequency-shifted by −0.5 MHz to become a signal 12e. As a result, the signal in the higher 1 MHz band illustrated in FIG. 16D becomes centered on a frequency of 0 (MHz) in FIG. 16E.

At this point, the signal 12d illustrated in FIG. 16C and the signal 11e illustrated in FIG. 16E have very slight signal power due to the band limiting, and may be ignored in the receiving band. Also, the signal 11c illustrated in FIG. 16C and the signal 12e illustrated in FIG. 16E are placed at the same frequency as a result of the frequency shift. In addition, the signal 11c illustrated in FIG. 16C and the signal 12e illustrated in FIG. 16E are both signal components that passed through the band limit without being suppressed, correspond to the signals 11 and 12 in FIG. 16A, respectively, and are the same as each other.

Consequently, the signal in the receiving band illustrated in FIG. 16C and the signal in the receiving band illustrated in FIG. 16E have a high similarity (correlation).

In other words, the pattern matching unit 503 determines that the correlation is high according to the pattern matching process on the signals respectively received from the frequency shift units 501 and 502.

<Spectral Placement Mode 2C>

FIGS. 17A to 17E illustrate how the frequency spectrum changes in the determination unit 102c in the case of receiving a signal in the spectral placement mode 2C.

FIG. 17A illustrates the signal spectrum of a signal in the spectral placement mode 2C. As illustrated in FIG. 17A, the 2 MHz OFDM signal 13 is made up of a signal component 14 placed in the higher 1 MHz band, and a signal component 15 placed in the lower 1 MHz band.

FIG. 17B illustrates the signal spectrum after the lower extraction unit 301 applies the band limit 51. As illustrated in FIG. 17B, since the signal component 15 placed in the lower 1 MHz band is placed in the passband of the band limit 51, the signal component passes through without being suppressed. On the other hand, since the signal component 14 placed in the higher 1 MHz band is placed outside the passband of the band limit 51, the signal component is suppressed to become a signal 14a. FIG. 17C illustrates how the frequency shift unit 501 shifts the frequency of the signal illustrated in FIG. 17B by +0.5 MHz. As illustrated in FIG. 17C, the signal in the lower 1 MHz band is frequency-shifted by +0.5 MHz to become a signal 15a, while the signal in the higher 1 MHz band is frequency-shifted by +0.5 MHz to become a signal 14b. As a result, the signal in the lower 1 MHz band illustrated in FIG. 17B becomes centered on a frequency of 0 (MHz) in FIG. 17C.

FIG. 17D illustrates the signal spectrum after the higher extraction unit 302 applies the band limit 52. As illustrated in FIG. 17D, since the signal component 15 placed in the lower 1 MHz band is placed outside the passband of the band limit 52, the signal component is suppressed to become a signal 15b. On the other hand, since the signal component 14 placed in the higher 1 MHz band is placed in the passband of the band limit 52, the signal component passes through without being suppressed. FIG. 17E illustrates how the frequency shift unit 502 shifts the frequency of the signal illustrated in FIG. 17D by −0.5 MHz. As illustrated in FIG. 17E, the signal in the lower 1 MHz band is frequency-shifted by −0.5 MHz to become a signal 15c, while the signal in the higher 1 MHz band is frequency-shifted by −0.5 MHz to become a signal 14c. As a result, the signal in the lower 1 MHz band illustrated in FIG. 17D becomes centered on a frequency of 0 (MHz) in FIG. 17E.

At this point, the signal 14b illustrated in FIG. 17C and the signal 15c illustrated in FIG. 17E have very slight signal power due to the band limiting, and may be ignored in the receiving band. Also, the signal 15a illustrated in FIG. 17C and the signal 14c illustrated in FIG. 17E are placed at nearly the same frequency as a result of the frequency shift. However, the signal 15a illustrated in FIG. 17C and the signal 14c illustrated in FIG. 17E are both signal components that passed through the band limit without being suppressed, correspond to the signal components 15 and 14 in FIG. 17A, respectively, and are different from each other.

Consequently, the signal in the receiving band illustrated in FIG. 17C and the signal in the receiving band illustrated in FIG. 17E have a low similarity (correlation).

In other words, the pattern matching unit 503 determines that the correlation is low according to the pattern matching process on the signals respectively received from the frequency shift units 501 and 502.

Note that for the spectral placement modes 1U and 1L, since a signal component is placed in one of either the higher 1 MHz band or the lower 1 MHz band, a low similarity (correlation) will be determined from pattern matching between the higher 1 MHz band the lower 1 MHz band for received signals obtained by the above operation.

The correspondence relationships illustrated in FIG. 18 summarize the pattern matching results (correlation) between the higher 1 MHz band and the lower 1 MHz band for each of the received signals in the spectral placement modes 1D and 2C described above. For example, in FIG. 18, "small" indicates that the correlation value is less than a threshold value, while "large" indicates that the correlation value is equal to or greater than a threshold value.

The transmission mode determination unit 504 uses the pattern matching result received from the pattern matching unit 503 (the correlation between the signal in the lower 1 MHz band and the signal in the higher 1 MHz band illustrated in FIG. 18), and on the basis of the correspondence relationships illustrated in FIG. 18, determines the transmission mode (spectral placement mode) being used in the received signal.

In other words, when the above correlation value is "large", the transmission mode determination unit 504 determines that the 1 MHz Duplicate format (1D) is being used, in which the same signal is placed in the higher 1 MHz band and the lower 1 MHz band. Also, when the above correlation value is "small", the transmission mode determination unit 504 determines that the 2 MHz format (2C) is being used, in which different signals are placed in the higher 1 MHz band and the lower 1 MHz band.

As illustrated in FIG. 18, the transmission mode determination unit 504 is able to determine the transmission mode while distinguishing between the spectral placement modes 1U or 1L, 1D, and 2C. In other words, the transmission mode determination unit 504 is able to determine the bandwidth of the received signal, and also whether the mode of a received signal placed in the 2 MHz band is 1D or 2C.

As above, according to the present embodiment, the determination unit 102c is able to use the correlation of signals in the higher 1 MHz band and the lower 1 MHz band to accurately detect the transmission mode (placement mode), and improve communication efficiency.

Embodiment 5

In the present embodiment, the operation of the determination unit of the wireless communication device 100 (FIG. 3) differs compared to Embodiments 1 to 4.

Figure 19:
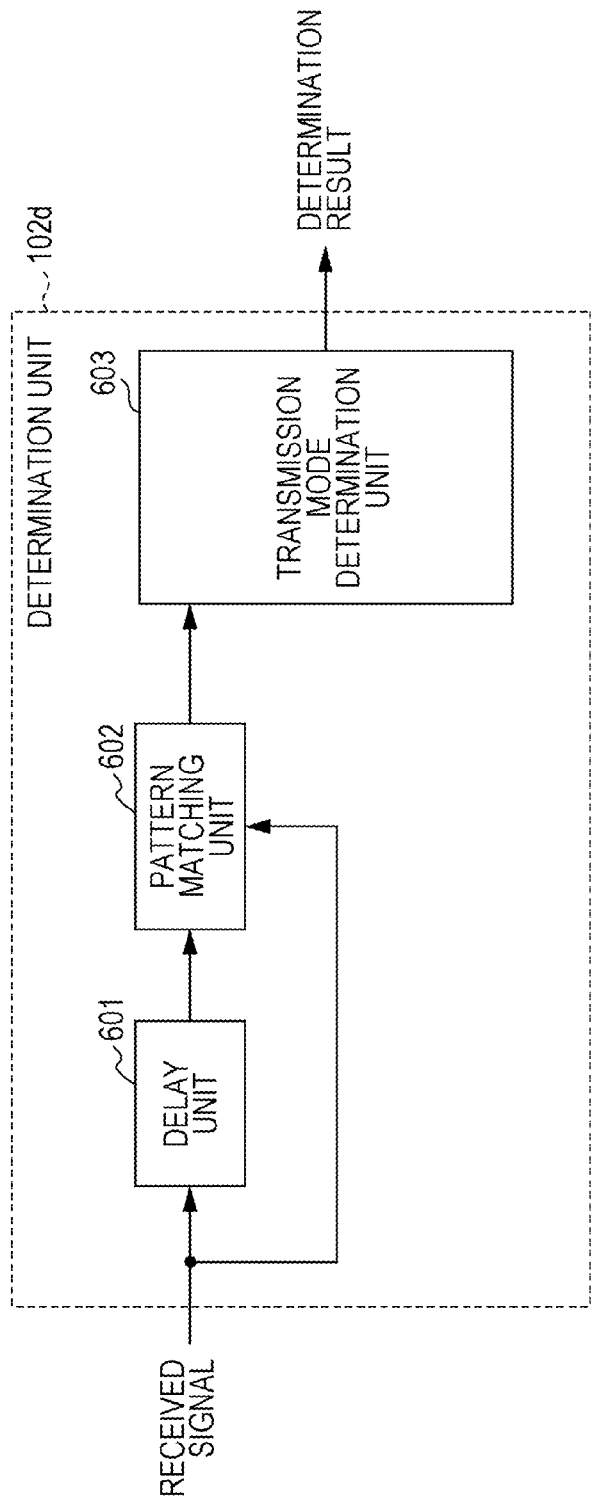
FIG. 19 is a block diagram illustrating an internal configuration of a determination unit according to Embodiment 5 of the present disclosure.

FIG. 19 is a block diagram illustrating an internal configuration of a determination unit 102d according to the present embodiment.

In the determination unit 102d illustrated in FIG. 19, a delay unit 601 delays the received signal received from the tuner 101 by a predetermined time. For example, the delay unit 601 delays the received signal by a time corresponding to the STF in the 2 MHz (short/long) format (see FIG. 1).

A pattern matching unit 602 conducts a pattern matching process (correlation process) on the received signal received from the tuner 101 (no delay) and the received signal received from the delay unit 601 (delayed).

For example, as illustrated in FIG. 1, the number of symbols in the STF of the 2 MHz format (10 symbols) is half the number of symbols in the STF of the 1 MHz format (20 symbols). Consequently, for example, the pattern matching unit 602 computes a correlation value between the pre-delay received signal and the delayed received signal. The computation of the above correlation value is conducted during the period from a time point after the predetermined delay time elapses since the beginning of the pre-delay received signal to the time point after the of time corresponding to half the number of symbols in the STF of the 1 MHz format elapses. In other words, the pattern matching unit 602 computes the correlation value between the pre-delay received signal and the delayed received signal during the period from the beginning of the delayed received signal to the time point after the time corresponding to half the number of symbols in the STF of the 1 MHz format elapses.

A transmission mode determination unit 603 uses the pattern matching result received from the pattern matching unit 602 to determine the transmission mode (spectral placement mode) being used in the received signal. Specifically, the transmission mode determination unit 603 determines that the 1 MHz format is being used when the correlation value resulting from the pattern matching process is high, and determines that the 2 MHz format is being used when the correlation value is low.

Hereinafter, operation of the transmission mode determination process by the determination unit 102d will be described in detail.

Figure 20:
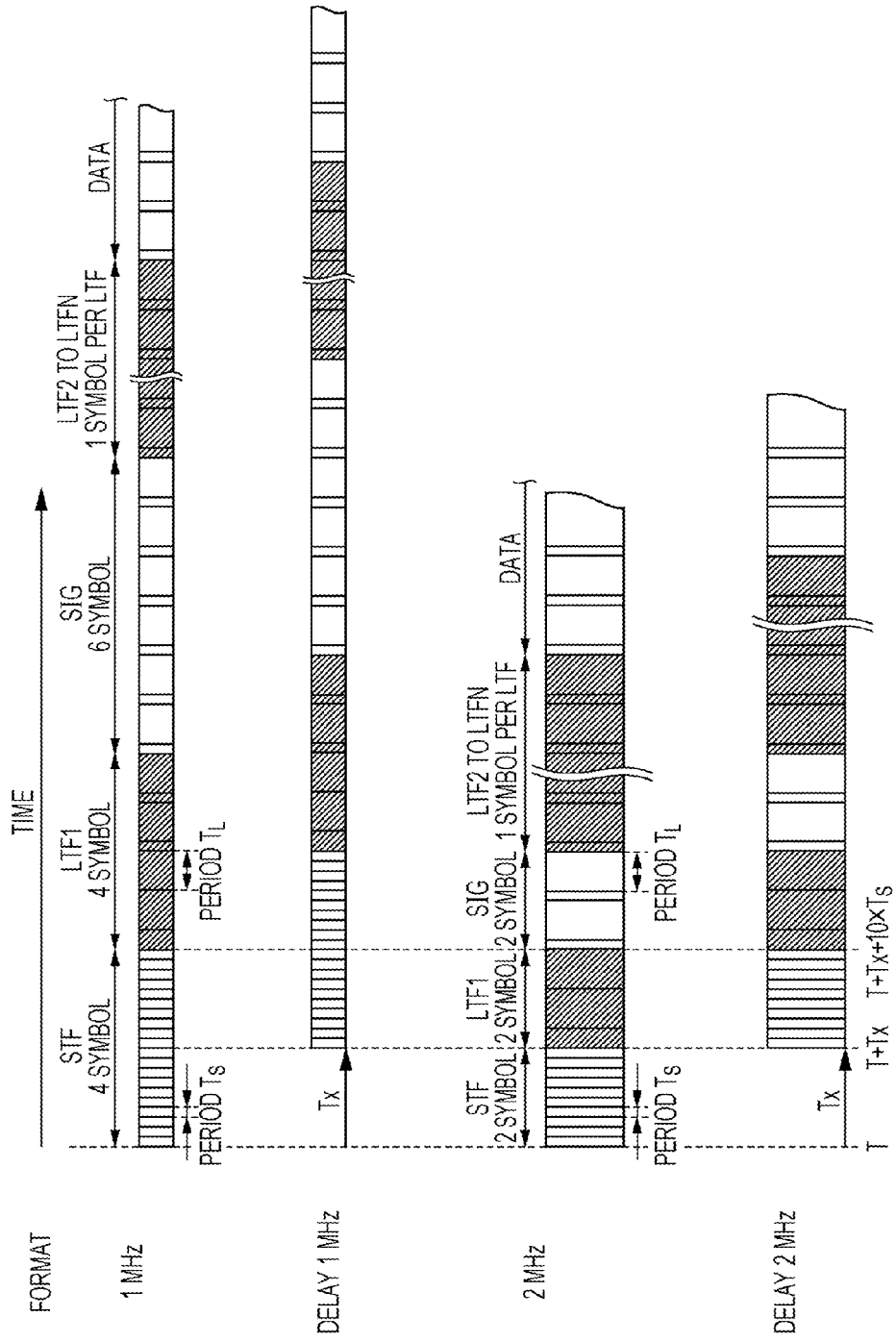
FIG. 20 is a diagram illustrating a delay process for signals in each transmission format according to Embodiment 5 of the present disclosure.

FIG. 20 illustrates frames using the 1 MHz or 2 MHz communication band of 802.11ah, and those frames delayed by a time Tx.

As illustrated in FIG. 20, the time Tx is a time that corresponds to the STF in the 2 MHz format.

In FIG. 20, T is the time at the beginning of a frame, and the period from time T+Tx to time T+Tx+10×$T_S$ will be considered. In other words, the period from the point in time (time T+Tx) that is a time Tx after the beginning of the pre-delay received signal (time T) to the time (time T+Tx+10×$T_S$) after the elapsing of a time 10×$T_S$ corresponding to half the number of symbols in the STF of the 1 MHz format (or the number of symbols in the STF of the 2 MHz format) will be considered.

In the 1 MHz case, the above period of time corresponds to part of the STF in both the pre-delay received signal and the delayed received signal, and corresponds to a segment in which the same signal is repeatedly placed in the STF. Consequently, in the pattern matching process that the pattern matching unit 602 conducts on these signal, a highly correlative result is obtained.

On the other hand, in the 2 MHz case, the above period of time corresponds to the LTF1 in the pre-delay received signal, and corresponds to the STF in the delayed received signal. In other words, in the above period of time, the pre-delay received signal and the delayed received signal are different signals. Consequently, in the pattern matching process that the pattern matching unit 602 conducts on these signal, a lowly correlative result is obtained.

Subsequently, the transmission mode determination unit 603 uses the result of the pattern matching process (the correlation) from the pattern matching unit 602 to determine the transmission mode being used in the received signal. In other words, the transmission mode determination unit 603 determines that the transmission mode is the 1 MHz format when the pattern matching process returns a highly correlative result, and determines that the transmission mode is the 2 MHz format when the pattern matching process returns a lowly correlative result.

In this way, in the present embodiment, by varying the value of the time Tx according to the STS period $T_S$, the LTS period $T_L$, and the difference between the number of STS and LTS repetitions in the 1 MHz/2 MHz formats, the pattern matching results may be differentiated between the 1 MHz format and the 2 MHz format. In so doing, the determination unit 102d is able to accurately detect the transmission mode and improve communication efficiency, on the basis of changes in the correlation result from pattern matching.

Note that the present embodiment describes the case of setting the delay time Tx to a time corresponding to the STF symbols in the 2 MHz format. However, the delay time is not limited thereto, and may be set to any time insofar as the pattern matching results differ between the 1 MHz format and the 2 MHz format.

Embodiment 6

Figure 21:
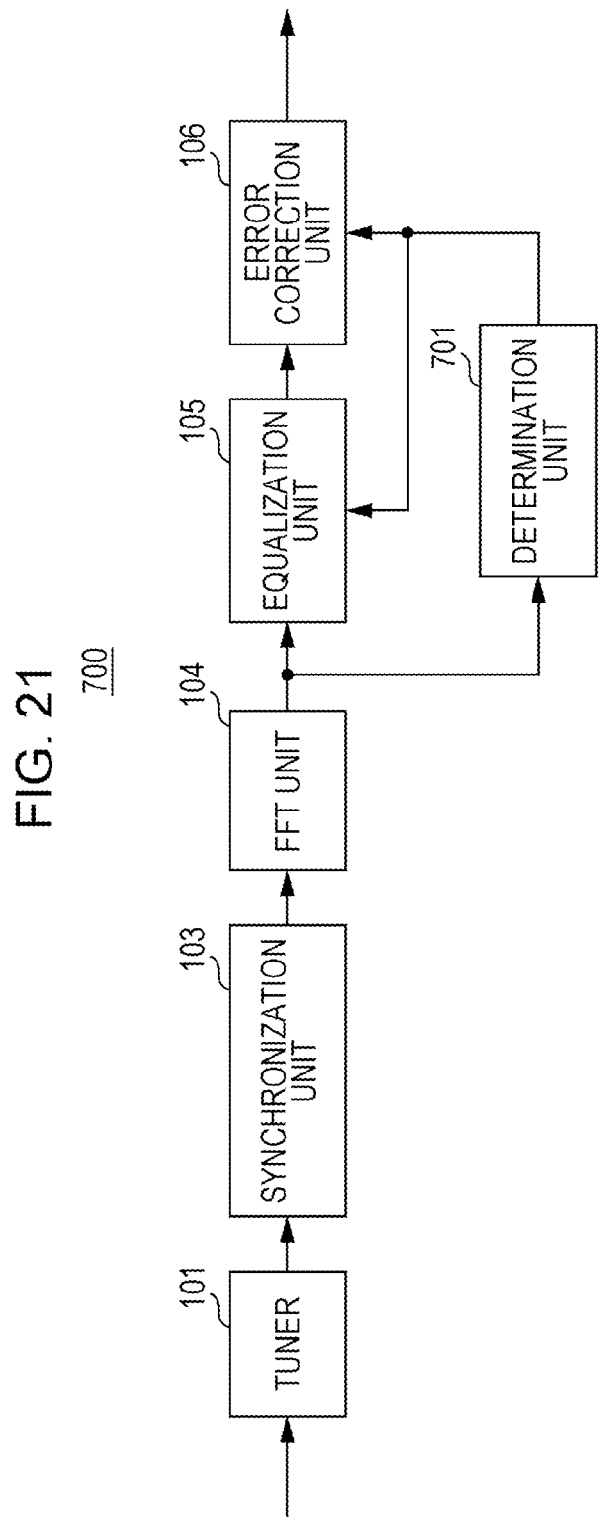
FIG. 21 is a block diagram illustrating a configuration of a wireless communication device according to Embodiment 6 of the present disclosure.

FIG. 21 is a block diagram illustrating a configuration of a wireless communication device 700 according to the present embodiment. Note that in FIG. 21, the same signs are given to components that conduct the same operations as Embodiment 1 (FIG. 3), and description thereof will be reduced or omitted.

In the wireless communication device 700 illustrated in FIG. 21, a determination unit 701 uses the signal received from the FFT unit 104 to determine the transmission mode being used in the received signal. Specifically, the determination unit 701 determines the transmission format being used in the received signal from among multiple transmission formats by using multiple symbols, including the symbols constituting the LTF (LTS) and the symbols constituting the SIG from a received signal using any one of multiple transmission formats that include the LTF and the SIG, and use the lower 1 MHz band or the higher 1 MHz band.

Figure 22:
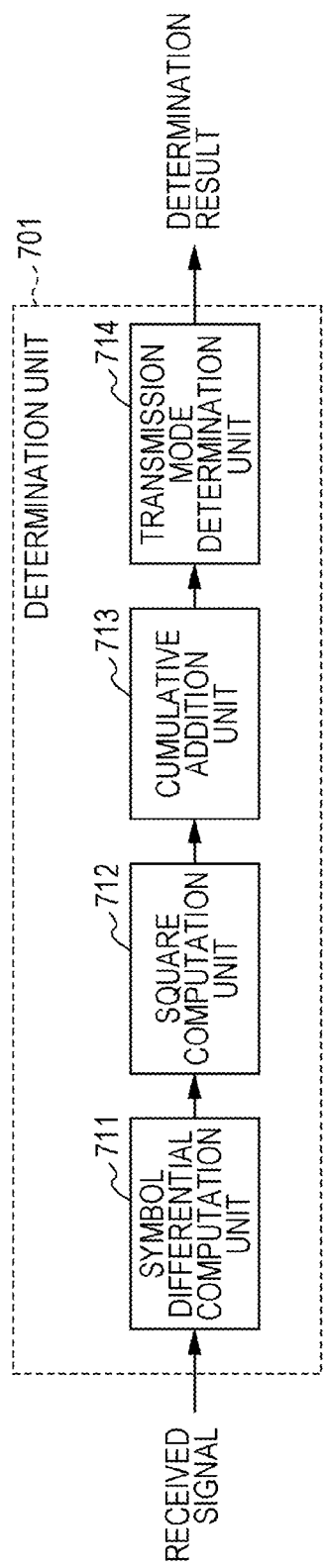
FIG. 22 is a block diagram illustrating an internal configuration of a determination unit according to Embodiment 6 of the present disclosure.

FIG. 22 is a block diagram illustrating an internal configuration of the determination unit 701. The determination unit 701 includes a symbol differential computation unit 711, a square computation unit 712, a cumulative addition unit 713, and a transmission mode determination unit 714.

The symbol differential computation unit 711 conducts a differential computation between the symbols in the LTF or the SIG. The symbols subjected to the symbol differential computation in the symbol differential computation unit 711 are the same irrespective of the transmission format configured in the wireless communication device 700. For example, the symbol differential computation unit 711 conducts differential computation between neighboring symbols in the time domain on the three symbols (LTF or SIG) from the 2nd symbol to the 4th symbol starting from the beginning of the LTF.

The square computation unit 712 conducts a squaring operation on the computational result of the symbol differential computation unit 711 in each subcarrier.

The cumulative addition unit 713 cumulatively adds together the computational results from the square computation unit 712 for each subcarrier (vector addition).

The transmission mode determination unit 714 determines the transmission mode being used in the received signal on the basis of the combination of cumulatively added values (squared results) received from the cumulative addition unit 713. In other words, the transmission mode determination unit 714 determines the transmission mode being used in the received signal on the basis of whether the values indicated by the cumulatively added values (squared results) received from the cumulative addition unit 713 are positive values or negative values on the real axis.

[Transmission Mode Determination Method]

Figure 23:
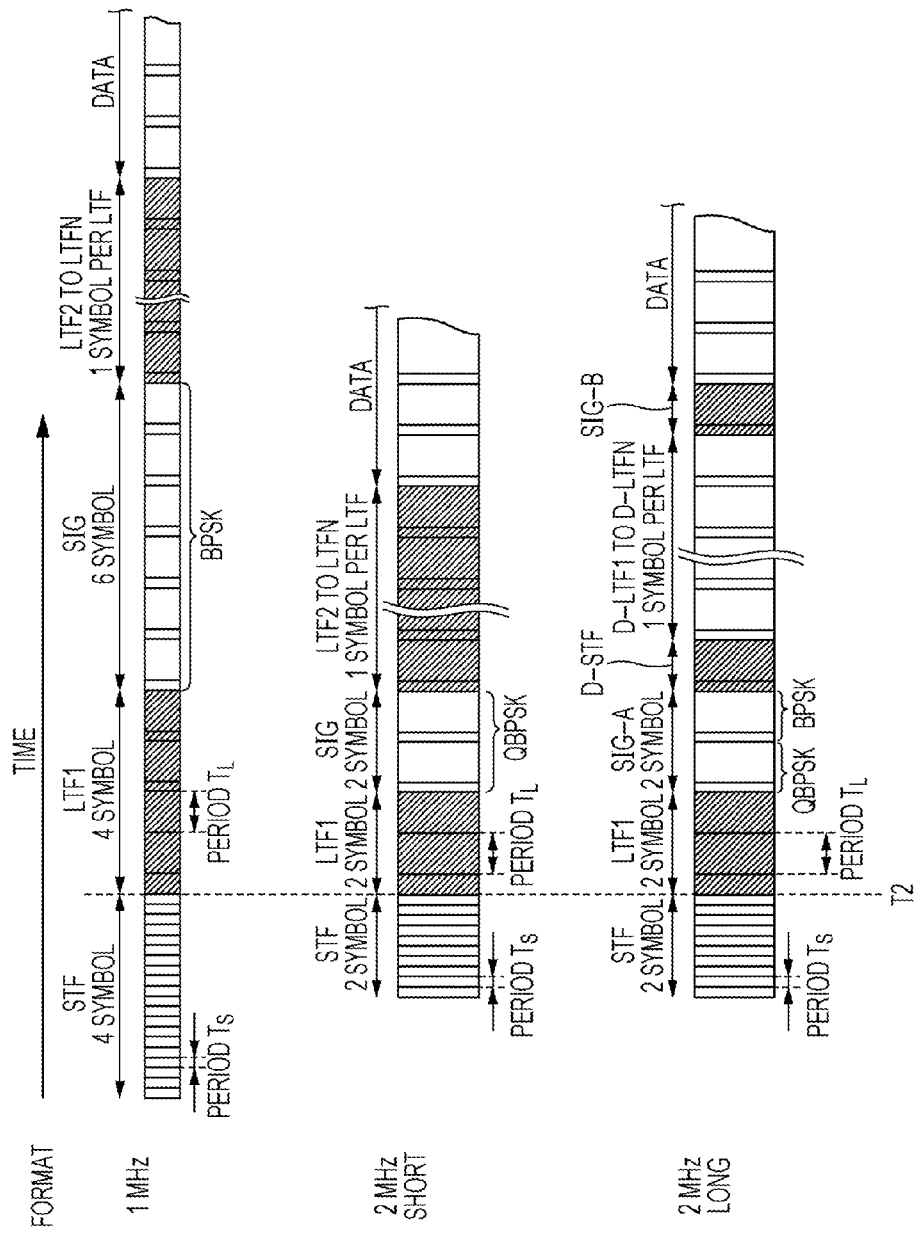
FIG. 23 is a diagram illustrating the relative position of each transmission format aligned at the beginning of the LTF according to Embodiment 6 of the present disclosure.

FIG. 23 is a diagram illustrating respective frames in transmission formats of 802.11ah (1 MHz short, 2 MHz short, 2 MHz long), with the frames aligned so that the beginning of the LTF is at time T2. The wireless communication device 700 detects the timing of the beginning of the LTF using the STF, for example.

The symbol differential computation unit 711 extracts the 2nd, 3rd, and 4th symbols from the beginning of the LTF (time T2) in the 802.11ah transmission formats (see FIG. 23), and conducts the symbol differential computation.

Figure 24:
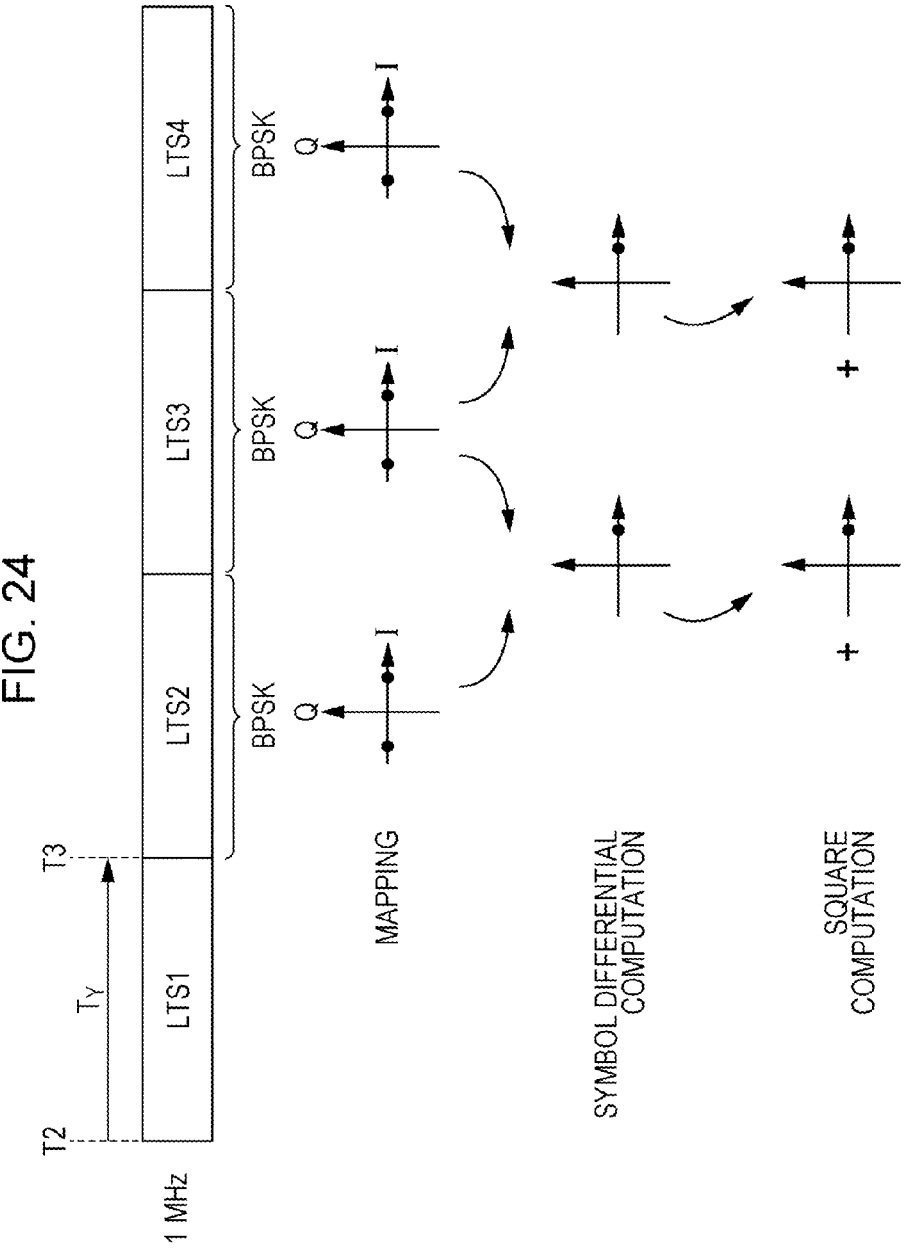
FIG. 24 is a diagram accompanying explanation of a transmission mode determination process according to Embodiment 6 of the present disclosure (for the case of 1 MHz format)
Figure 25:
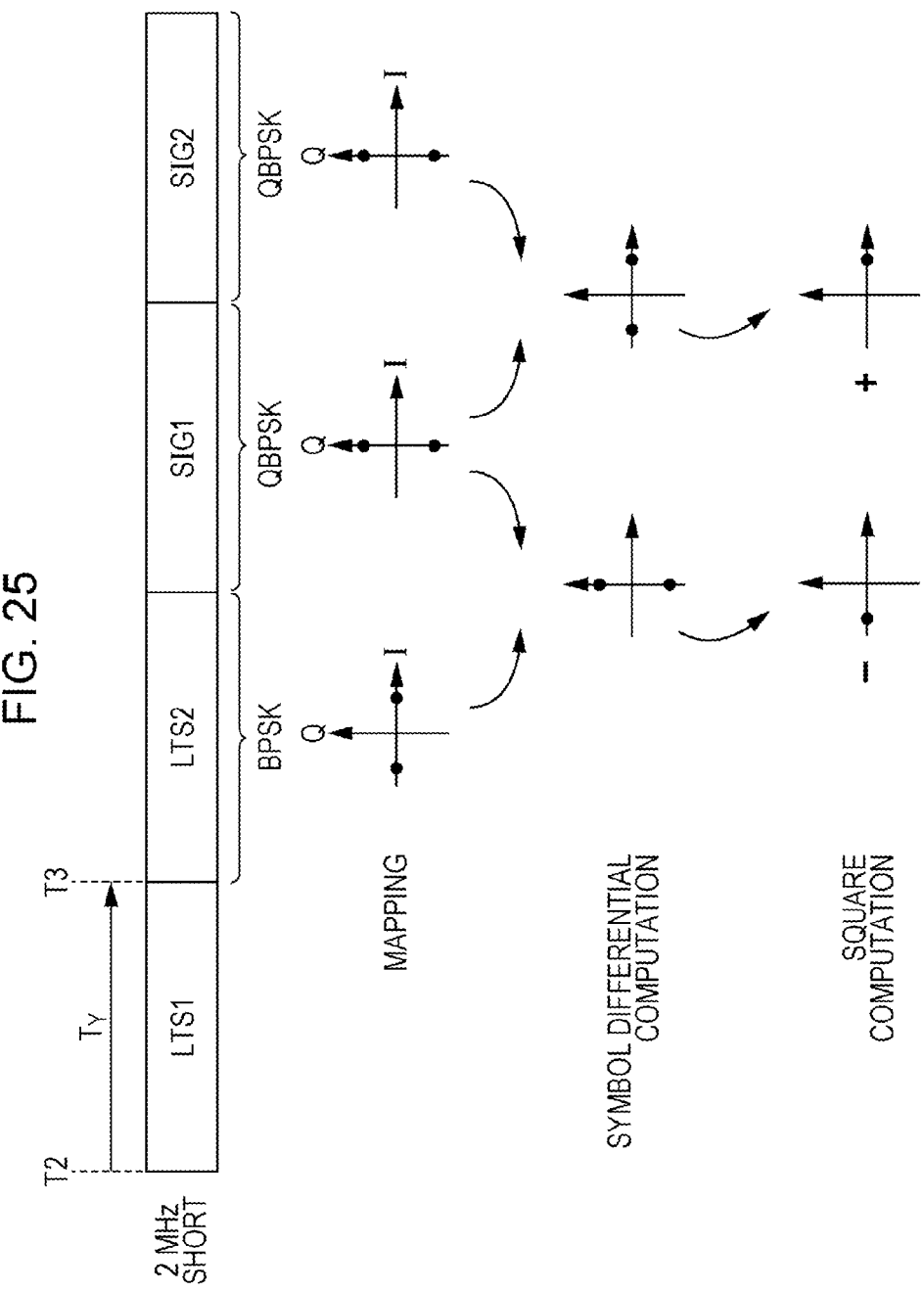
FIG. 25 is a diagram accompanying explanation of a transmission mode determination process according to Embodiment 6 of the present disclosure (for the case of 2 MHz short format)
Figure 26:
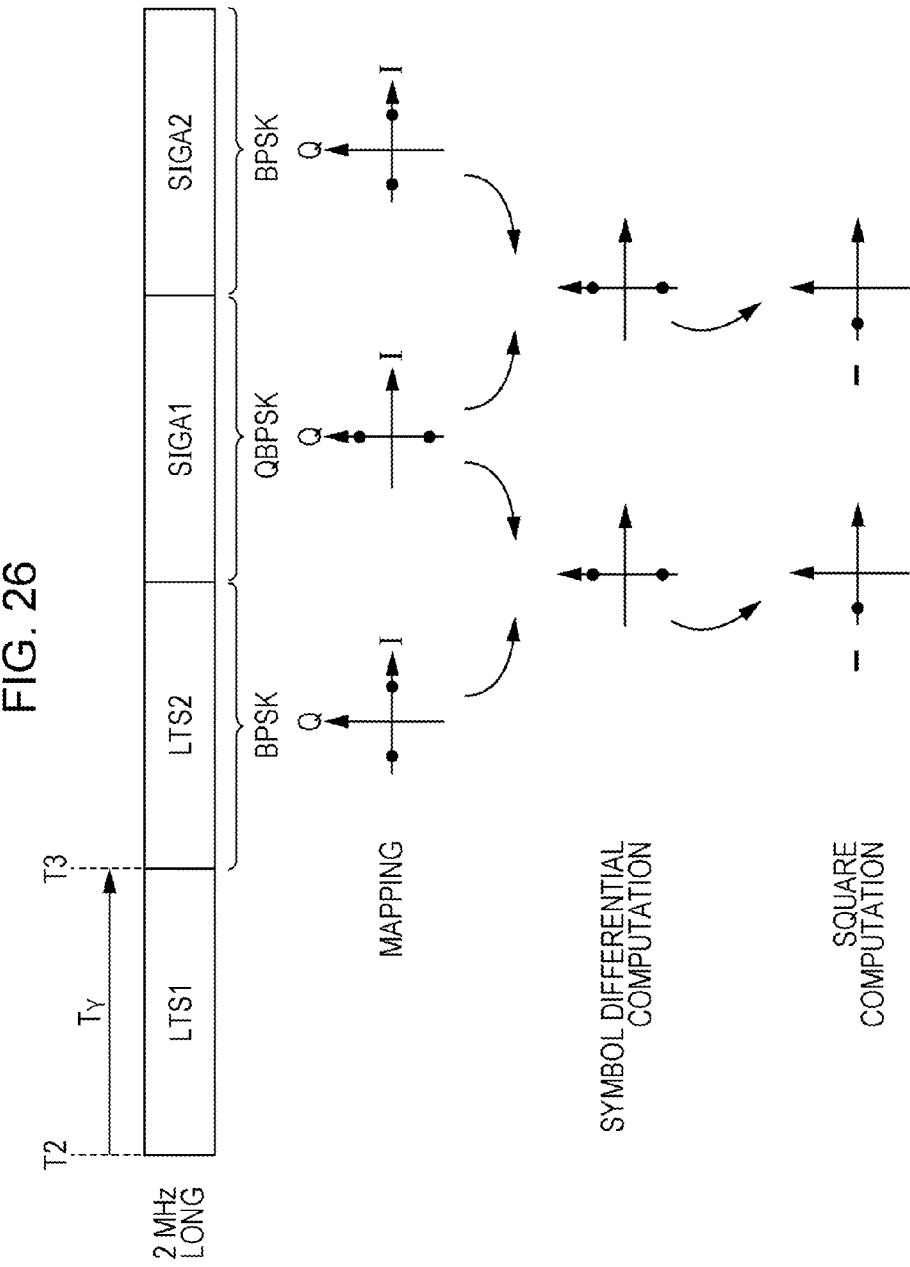
FIG. 26 is a diagram accompanying explanation of a transmission mode determination process according to Embodiment 6 of the present disclosure (for the case of 2 MHz long format)

FIGS. 24, 25, and 26 are diagrams illustrating four symbols starting from the time T2 in the respective frames in the 1 MHz, 2 MHz short, and 2 MHz long formats.

As illustrated in FIGS. 24, 25, and 26, the 2nd, 3rd, and 4th symbols starting from the beginning of the LTF (time T2) are LTF (LTF) or SIG (SIG1) symbols. Herein, in the LTF, the phase of the pilot for each subcarrier is predetermined to be 0 degrees or 180 degrees. In other words, the phase of the pilot of the LTF has the same features as the mapping of a signal in the BPSK modulation scheme. Meanwhile, SIG (or SIG-A) differ for each transmission format. As illustrated in FIG. 1, in the 1 MHz format (short and Duplicate), BPSK modulation is used on all six symbols. On the other hand, in the 2 MHz short format, quadrature BPSK (QBPSK) modulation is used on all two symbols. QBPSK modulation is a scheme in which symbols are phase-modulated at 90 degrees and 270 degrees. In other words, the phase differs by 90 degrees from BPSK modulation. Also, in the 2 MHz long format, QBPSK modulation is used for the first of two symbols, while BPSK modulation is used for the second symbol.

In other words, multiplexed into the SIG are control signals that have been modulated according to a modulation scheme (BPSK or QBPSK) that uses the same phase as, or a phase existing in an orthogonal relationship with, the phase in which the pilot signal is placed in the LTF.

Hereinafter, operation of the determination unit 701 in the case of receiving a signal in each transmission format will be described.

Specifically, in the 1 MHz signal illustrated in FIG. 24, starting from a time T3 after the elapsing of an amount of time Ty since a time T2, the three symbols LTS2, LTS3, and LTS4 are placed consecutively in the time domain. The symbol differential computation unit 711 computes the symbol differential between neighboring symbols in the time domain on these three symbols. All of these LTS are modulated using BPSK, in which signal points are mapped onto the real axis of the complex plane. Thus, as illustrated in FIG. 24, the result of the symbol differential between LTS2 and LTS3 as well as the result of the symbol differential between LTS3 and LTS4 are both positive values on the real axis of the complex plane. Subsequently, the square computation unit 712 computes the square of the symbol differential results. As illustrated in FIG. 24, the square of the symbol differential between LTS2 and LTS3 as well as the square of the symbol differential between LTS3 and LTS4 are both positive values on the real axis of the complex plane.

In the 2 MHz short signal illustrated in FIG. 25, starting from the time T3 after the elapsing of the amount of time $T_Y$ since the time T2, the three symbols LTS2, SIG1, and SIG2 are placed consecutively in the time domain. The symbol differential computation unit 711 computes the symbol differential between neighboring symbols in the time domain on these three symbols. As discussed above, the LTS is modulated using BPSK, in which signal points are mapped onto the real axis of the complex plane. Meanwhile, the SIG symbols are modulated using QBPSK, in which signal points are mapped onto the imaginary axis of the complex plane. Thus, as illustrated in FIG. 25, the result of the symbol differential between LTS2 and SIG1 is a value on the imaginary axis of the complex plane. Also, the result of the symbol differential between SIG1 and SIG2 is a value on the real axis of the complex plane. Subsequently, the square computation unit 712 computes the square of the symbol differential results. As illustrated in FIG. 25, the square of the symbol differential between LTS2 and SIG1 is a negative value on the real axis of the complex plane. Also, the square of the symbol differential between SIG1 and SIG2 is a positive value on the real axis of the complex plane.

In the 2 MHz long signal illustrated in FIG. 26, starting from the time T3 after the elapsing of the amount of time $T_Y$ since the time T2, the three symbols LTS2, SIGA1, and SIGA2 are placed consecutively in the time domain. The symbol differential computation unit 711 computes the symbol differential between neighboring symbols in the time domain on these three symbols. As discussed above, the LTS is modulated using BPSK, in which signal points are mapped onto the real axis of the complex plane. Meanwhile, SIGA1 is modulated using QBPSK, in which signal points are mapped onto the imaginary axis of the complex plane, and SIGA2 is modulated using BPSK. Thus, as illustrated in FIG. 26, the result of the symbol differential between LTS2 and SIGA1 as well as the result of the symbol differential between SIGA1 and SIGA2 are both values on the imaginary axis of the complex plane. Subsequently, the square computation unit 712 computes the square of the symbol differential results. As illustrated in FIG. 26, the square of the symbol differential between LTS2 and SIGA1 as well as the square of the symbol differential between SIGA1 and SIGA2 are both negative values on the real axis of the complex plane.

In other words, the combination of modulation schemes used for the three symbols after time T3 differs according to the transmission format. Consequently, the results of the symbol differential computation and the square computation on the three symbols after time T3 differ according to each transmission format. For this reason, the transmission mode determination unit 714 determines the transmission mode on the basis of the results of the symbol differential computation and the square computation.

Specifically, when the squared result of the second and third symbols starting from the beginning of the LTF and the squared result of the third and fourth symbols starting from the beginning of the LTF are both positive values on the real axis (FIG. 24), the transmission mode determination unit 714 determines that the 1 MHz format is being used, in which all SIG control signals are modulated by a modulation scheme (BPSK) that uses phases existing in an in-phase relationship with the phase of the LTF pilot signal.

Also, when the squared result of the second and third symbols starting from the beginning of the LTF is a negative value on the real axis, and the squared result of the third and fourth symbols starting from the beginning of the LTF is a positive value on the real axis, the transmission mode determination unit 714 determines that the 2 MHz short format is being used, in which all SIG control signals are modulated by a modulation scheme (QBPSK) that uses a phase existing in an orthogonal relationship with the phase of the LTF pilot signal.

Also, when the squared result of the second and third symbols starting from the beginning of the LTF and the squared result of the third and fourth symbols starting from the beginning of the LTF are both negative values on the real axis, the transmission mode determination unit 714 determines that the 2 MHz long format is being used, in which one SIG control signal is modulated by a modulation scheme (QBPSK) that uses phases existing in an orthogonal relationship with the phase of the LTF pilot signal, while the other control signal is modulated by a modulation scheme (BPSK) that uses phases existing in an in-phase relationship with the phase of the LTF pilot signal.

Also, the cumulative addition unit 713 cumulatively adds over all subcarriers the values of the squared result obtained by the operations on each subcarrier illustrated in FIGS. 24 to 26. In so doing, the computational results obtained for each subcarrier may be averaged, enabling the transmission mode determination unit 714 to accurately determine whether the computational results are mapped to the real axis or the imaginary axis.

Figure 27:
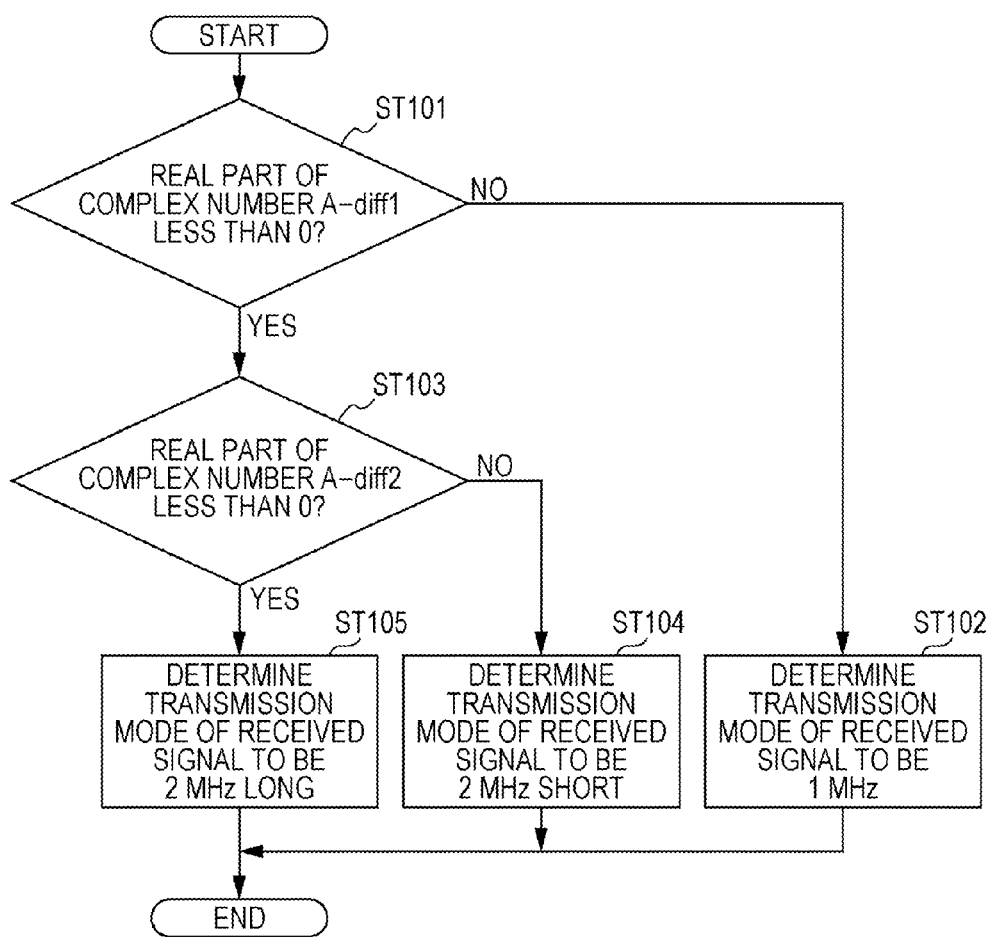
FIG. 27 is a flowchart illustrating the flow of a transmission mode determination process according to Embodiment 6 of the present disclosure.
Figure 28:
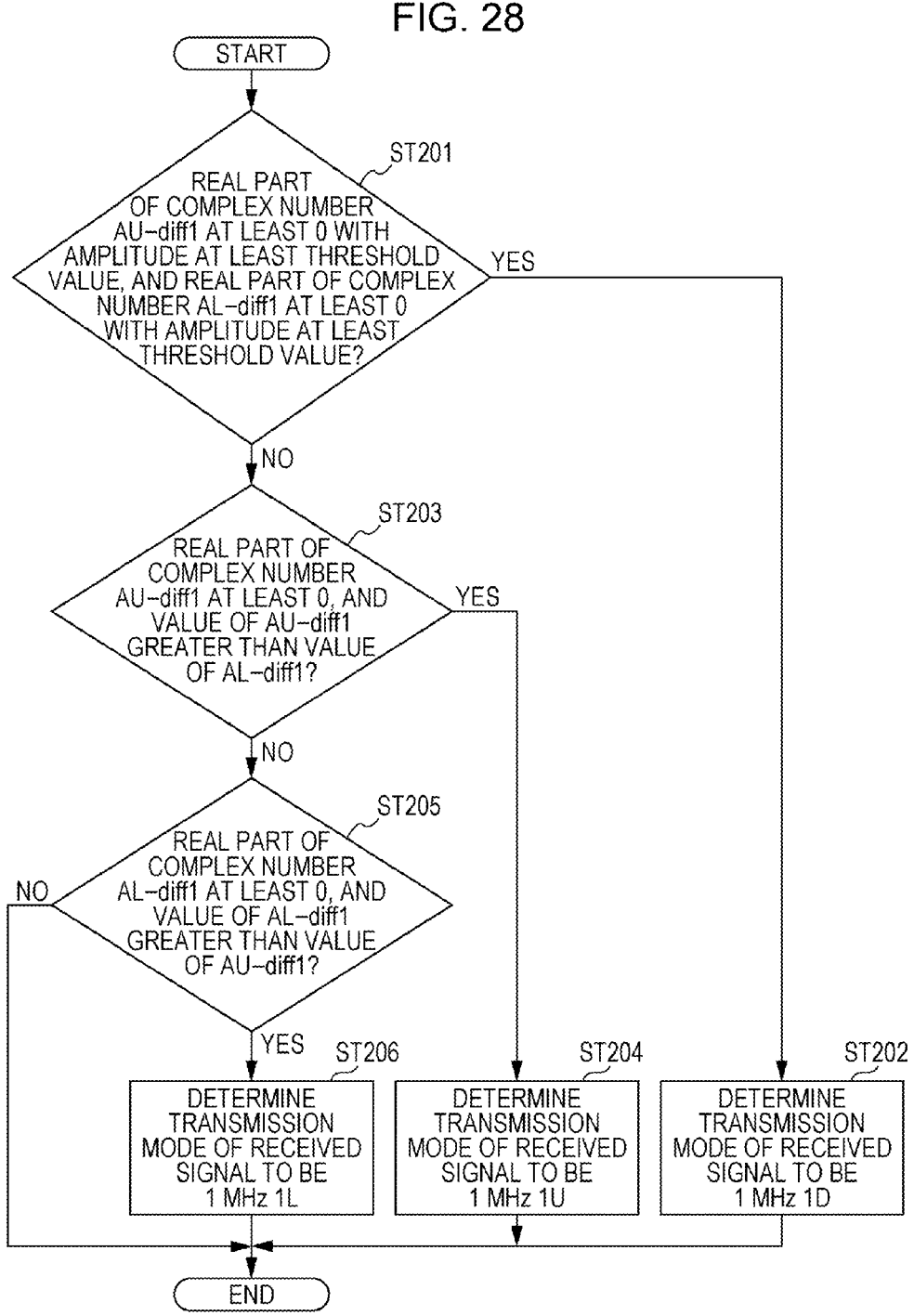
FIG. 28 is a flowchart illustrating the flow of a transmission mode determination process according to Embodiment 6 of the present disclosure.

FIGS. 27 and 28 are flowcharts illustrating a process flow of the transmission mode determination method discussed above. Specifically, FIG. 27 illustrates a process of determining three types of transmission modes (1 MHz, 2 MHz short, and 2 MHz long), while FIG. 28 illustrates a process of determining 1L, 1U, and 1D from among the 1 MHz transmission modes.

In FIGS. 27 and 28, the following parameters are used.

A-diff1: the result of squaring the symbol differential between the first and second symbols since time T3

A-diff2: the result of squaring the symbol differential between the second and third symbols since time T3

AL-diff1: the value corresponding to the lower 1 MHz band of A-diff1

AU-diff1: the value corresponding to the higher 1 MHz band of A-diff1

AL-diff2: the value corresponding to the lower 1 MHz band of A-diff2

AU-diff2: the value corresponding to the higher 1 MHz band of A-diff2

In FIG. 27, in ST101, the transmission mode determination unit 714 determines whether or not the real part of the complex number A-diff1 is less than 0. When the real part of the complex number A-diff1 is not less than 0 (ST101: No), in ST102, the transmission mode determination unit 714 determines that the transmission mode of the received signal is the 1 MHz format.

When the real part of the complex number A-diff1 is less than 0 (ST101: Yes), in ST103, the transmission mode determination unit 714 determines whether or not the real part of the complex number A-diff2 is less than 0. When the real part of the complex number A-diff2 is not less than 0 (ST103: No), in ST104, the transmission mode determination unit 714 determines that the transmission mode of the received signal is the 2 MHz short format.

On the other hand, when the real part of the complex number A-diff2 is less than 0 (ST103: Yes), in ST105, the transmission mode determination unit 714 determines that the transmission mode of the received signal is the 2 MHz long format.

Also, in FIG. 28, in ST201, the transmission mode determination unit 714 determines whether or not the real part of the complex number AU-diff1 is at least 0 with an amplitude that is at least a threshold value, and in addition, the real part of the complex number AL-diff1 is at least 0 with an amplitude that is at least a threshold value.

When the determination condition in ST201 is satisfied (ST201: Yes), in ST202, the transmission mode determination unit 714 determines the transmission mode of the received signal to be the 1 MHz Duplicate format (1D).

On the other hand, when the determination condition in ST201 is not satisfied (ST201: No), in ST203, the transmission mode determination unit 714 determines whether or not the real part of the complex number AU-diff1 is at least 0, and in addition, the value of AU-diff1 is greater than the value of AL-diff1.

When the determination condition in ST203 is satisfied (ST203: Yes), in ST204, the transmission mode determination unit 714 determines the transmission mode of the received signal to be 1 MHz 1U.

On the other hand, when the determination condition in ST203 is not satisfied (ST203: No), in ST205, the transmission mode determination unit 714 determines whether or not the real part of the complex number AL-diff1 is at least 0, and in addition, the value of AL-diff1 is greater than the value of AU-diff1.

When the determination condition in ST205 is satisfied (ST205: Yes), in ST206, the transmission mode determination unit 714 determines the transmission mode of the received signal to be 1 MHz 1L.

On the other hand, when the determination condition in ST205 is not satisfied (ST205: No), the transmission mode determination unit 714 ends the process without determining the transmission mode.

In this way, the present embodiment focuses on the different combinations of modulation schemes according to transmission format for the three symbols of the 2nd, 3rd, and 4th symbols starting from the beginning of the LTF, and the wireless communication device 700 determines the transmission mode on the basis of the differentials of the modulation schemes of symbols including the LTF and the SIG. In so doing, the transmission mode may be accurately detected, and communication efficiency may be improved.

Note that in the present embodiment, the transmission mode is determined according to whether an I-axis signal obtained by a squaring operation is positive or negative. However, since the magnitude of the signal distribution on the I axis and the Q axis differs by transmission mode before the squaring operation, obviously it is also possible to determine the transmission mode by using a magnitude comparison between the total magnitude of the I-axis signal and the total magnitude of the Q-axis signal.

Embodiment 7

Figure 29:
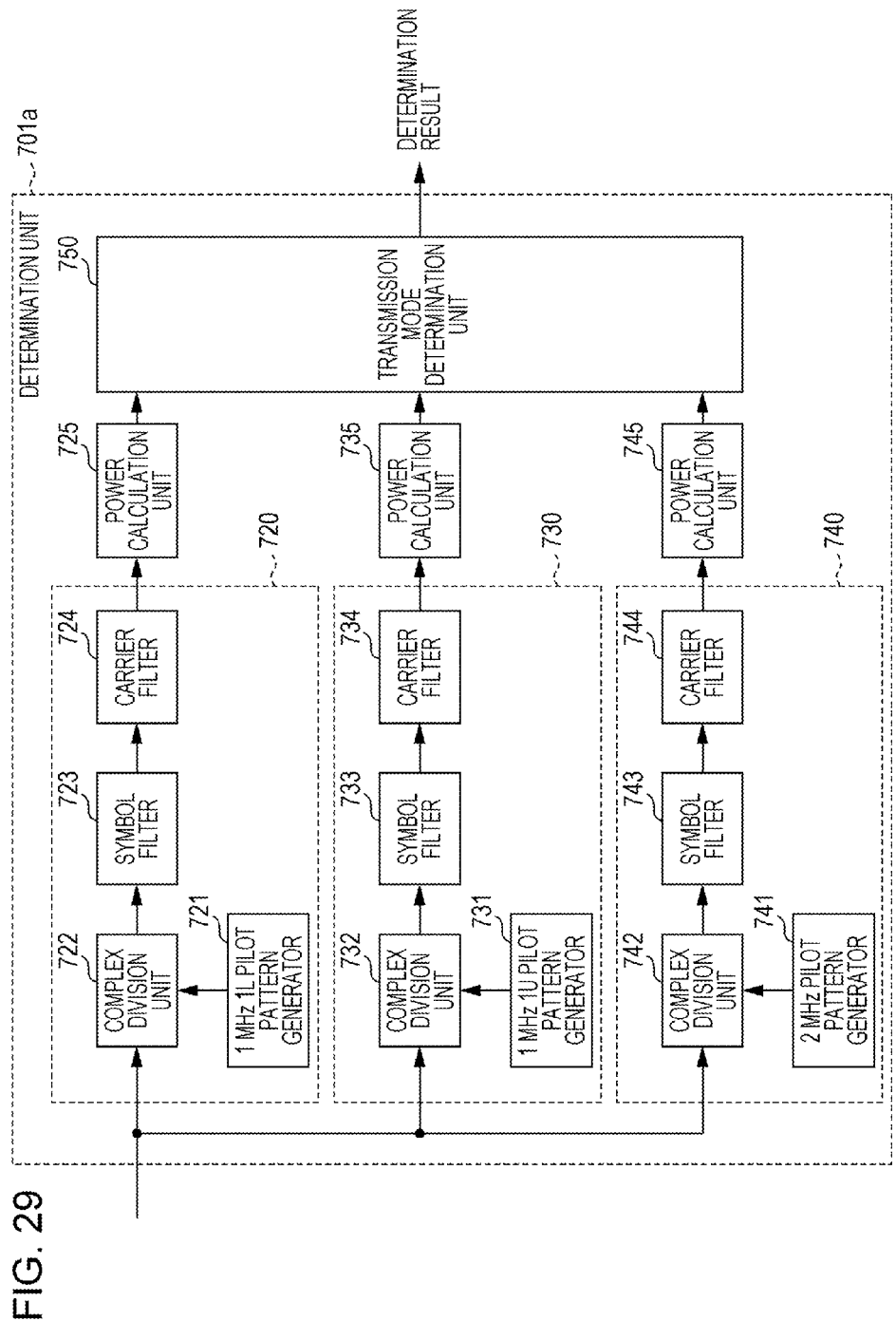
FIG. 29 is a block diagram illustrating an internal configuration of a determination unit according to Embodiment 7 of the present disclosure.

In the present embodiment, the operation of the determination unit in FIG. 21 differs compared to Embodiment 6. FIG. 29 is a block diagram illustrating an internal configuration of a determination unit 701a according to the present embodiment. The determination unit 701a includes a 1 MHz 1L channel estimation unit 720, a 1 MHz 1U channel estimation unit 730, a 2 MHz channel estimation unit 740, power calculation units 725, 735, and 745, and a transmission mode determination unit 750.

A frequency-domain OFDM signal (received signal) output from the FFT unit 104 is input into the determination unit 701a, and the frequency-domain OFDM signal is supplied to the 1 MHz 1L channel estimation unit 720, the 1 MHz 1U channel estimation unit 730, and the 2 MHz channel estimation unit 740.

When a 1 MHz 1L signal is input, the 1 MHz 1L channel estimation unit 720 outputs an estimated channel state value. On the other hand, when a signal other than 1 MHz 1L is input, the 1 MHz 1L channel estimation unit 720 outputs energy-diffuse noise.

When a 1 MHz 1U signal is input, the 1 MHz 1U channel estimation unit 730 outputs an estimated channel state value. On the other hand, when a signal other than 1 MHz 1U is input, the 1 MHz 1U channel estimation unit 730 outputs energy-diffuse noise.

When a 2 MHz (2C) signal is input, the 2 MHz channel estimation unit 740 outputs an estimated channel state value. On the other hand, when a signal other than 2 MHz (2C) is input, the 2 MHz channel estimation unit 740 outputs energy-diffuse noise.

The power calculation unit 725 calculates the power of the output from the 1 MHz 1L channel estimation unit 720, while the power calculation unit 735 calculates the power of the output from the 1 MHz 1U channel estimation unit 730, and the power calculation unit 745 calculates the power of the output from the 2 MHz channel estimation unit 740. Each calculated power is respectively supplied to the transmission mode determination unit 750.

The transmission mode determination unit 750, on the basis of each power received from the power calculation units 725, 735, and 745, determines and outputs whether the transmission mode being used in the received signal is 1 MHz 1L, 1 MHz 1U, 1 MHz 1D, or 2 MHz (2C).

[Transmission Mode Determination Method]

In the present embodiment, similarly to Embodiment 6, the wireless communication device 700 detects the timing of the beginning of the LTF using the STF as illustrated in FIG. 23, for example.

The 2 MHz short LTF1 and the 2 MHz long LTF1 are the same signal, but the 2 MHz and 1 MHz LTF1 each has a characteristic, predetermined phase pattern of the pilot multiplexed into each subcarrier in the frequency domain, so that the 2 MHz and the 1 MHz LTF1 are mutually orthogonal. In other words, the 2 MHz and 1 MHz LTF1 are different pilot phase patterns.

Consequently, for an LTS signal in 2 MHz format of a frequency-domain OFDM signal, the channel of the carrier position where the pilot signal is multiplexed may be estimated through complex division by the 2 MHz LTS pilot phase predetermined for each subcarrier. Spectrally, this estimated channel state value forms a line spectrum with concentrated energy.

On the other hand, when the LTS signal in 2 MHz format of a frequency-domain OFDM signal is complexly divided by the 1 MHz LTS pilot phase predetermined for each subcarrier, since the 2 MHz and 1 MHz LTS are mutually orthogonal (uncorrelated), energy is diffused in the band, and the spectrum becomes noise uniformly distributed in the band.

The total energy of the former line spectrum with concentrated energy and the total energy of the latter noise uniformly distributed in the band are equal, but the distribution conditions differ. At this point, by conducting the filtering process of the band limiting that allows the range containing the channel spectrum to pass through, the energy of the former after passing through the filter is unchanged, but the energy of the latter decreases after passing through the filter, with the decrease in energy being proportional to the narrowness of the passband width.

In other words, the determination unit 701*a* conducts channel estimation using the LTS pilot phase pattern of each format, respectively computes the power of the estimated channel state value after going through a band limit filter, and determines that the transmission format being used in the received signal is the transmission format that corresponds to largest calculated power calculated from among the powers of the estimated channel state values for each format.

Specifically, the 1 MHz 1L channel estimation unit 720 includes a 1 MHz 1L pilot pattern generator 721, a complex division unit 722, a symbol filter 723, and a carrier filter 724.

The 1 MHz 1L pilot pattern generator 721 generates a known phase pattern of the 1 MHz 1L pilot signal at the same timings as the subcarriers into which are inserted the pilot signals of the 1st and 2nd symbols in the LTF1 of the frequency-domain OFDM signal, and outputs the generated phase pattern to the complex division unit 722.

The complex division unit 722 assumes that the frequency-domain OFDM signal is in the 1 MHz 1L format, and from the frequency-domain OFDM signal extracts the signal of the subcarrier positions where the pilot signals of the 1st and 2nd symbols in the LTF1 of the 1 MHz 1L format are multiplexed. Subsequently, the complex division unit 722 conducts channel estimation by complexly dividing the extracted subcarrier signal by the known phase pattern generated from the 1 MHz 1L pilot pattern generator 721 corresponding to that carrier placement, and outputs an estimated channel state value to the symbol filter 723.

The symbol filter 723 accepts the estimated channel state value from the complex division unit 722 as input, conducts a filtering process in the symbol direction, and outputs to the carrier filter 724. For example, the symbol filter 723 uses the estimated channel state value of the 1st symbol and the 2nd symbol in the LTF1 to output the average between the two symbols in each subcarrier.

The carrier filter 724 accepts the estimated channel state value output by the symbol filter 723 as input, conducts a filtering process in the carrier direction, and outputs to the power calculation unit 725. For example, the carrier filter 724 may be a filter with time-amplitude characteristics that sets the guard interval length of the OFDM signal as the passband.

The 1 MHz 1U channel estimation unit 730 includes a 1 MHz 1U pilot pattern generator 731, a complex division unit 732, a symbol filter 733, and a carrier filter 734.

The 1 MHz 1U pilot pattern generator 731 generates a known phase pattern of the 1 MHz 1U pilot signal at the same timings as the subcarriers into which are inserted the pilot signals of the 1st and 2nd symbols in the LTF1 of the frequency-domain OFDM signal, and outputs the generated phase pattern to the complex division unit 732.

The complex division unit 732 assumes that the frequency-domain OFDM signal is in the 1 MHz 1U format, and from the frequency-domain OFDM signal extracts the signal of the subcarrier positions where the pilot signals of the 1st and 2nd symbols in the LTF1 of the 1 MHz 1U format are multiplexed. Subsequently, the complex division unit 732 conducts channel estimation by complexly dividing the extracted subcarrier signal by the known phase pattern generated from the 1 MHz 1U pilot pattern generator 731 corresponding to that carrier placement, and outputs an estimated channel state value to the symbol filter 733.

The symbol filter 733 and the carrier filter 734 conduct filtering processes that limit the estimated channel state value to the passband, and output to the power calculation unit 735. Since the symbol filter 733 is a filter having the same characteristics and function as the symbol filter 723 described earlier, further description will be omitted. Also, since the carrier filter 734 is a filter having the same characteristics and function as the carrier filter 724 described earlier, further description will be omitted.

The 2 MHz channel estimation unit 740 includes a 2 MHz pilot pattern generator 741, a complex division unit 742, a symbol filter 743, and a carrier filter 744.

The 2 MHz pilot pattern generator 741 generates a known phase pattern of the 2 MHz pilot signal at the same timings as the subcarriers into which are inserted the pilot signals of the 1st and 2nd symbols in the LTF1 of the frequency-domain OFDM signal, and outputs the generated phase pattern to the complex division unit 742.

The complex division unit 742 assumes that the frequency-domain OFDM signal is in the 2 MHz format, and from the frequency-domain OFDM signal extracts the signal of the subcarrier positions where the pilot signals of the 1st and 2nd symbols in the LTF1 of the 2 MHz format are multiplexed. Subsequently, the complex division unit 742 conducts channel estimation by complexly dividing the extracted subcarrier signal by the known phase pattern generated from the 2 MHz pilot pattern generator 741 corresponding to that carrier placement, and outputs an estimated channel state value to the symbol filter 743.

The symbol filter 743 and the carrier filter 744 conduct filtering processes that limit the estimated channel state value to the passband, and output to the power calculation unit 745. Since the symbol filter 743 is a filter having the same characteristics and function as the symbol filter 723 described earlier, further description will be omitted. Also, since the carrier filter 744 is a filter having the same characteristics and function as the carrier filter 724 described earlier, further description will be omitted.

The transmission mode determination unit 750 takes the output of the power calculation unit 725 to be the 1 MHz 1L power value, the output of the power calculation unit 735 to be the 1 MHz 1U power value, the output of the power calculation unit 745 to be the 2 MHz power value, and the sum of the output of the power calculation unit 725 and the output of the power calculation unit 735 to be the 1 MHz 1D. The transmission mode determination unit 750 then makes a weighted magnitude comparison of the respective power values, and outputs the format of the power value exhibiting the greatest value as the transmission mode being used in the received signal.

For example, the transmission mode determination unit 750 compares the 2 MHz power value, the 1 MHz 1L power value, and the 1 MHz 1U power value, and when the 2 MHz power value is the greatest, determines that the 2 MHz format is the transmission format being used in the received signal. Otherwise, the transmission mode determination unit 750 compares the power value of the 1 MHz 1L and the power value of the 1 MHz 1U weighted by a weighting coefficient $\alpha$ to the 1 MHz 1D power value. When the 1 MHz 1D power value is the greatest, the transmission mode determination unit 750 determines that the 1 MHz 1D format is the transmission format being used in the received signal. Otherwise, the transmission mode determination unit 750 compares the 1 MHz 1L power value and the 1 MHz 1U power value, and determines the greater value to be the transmission format being used in the received signal.

In this way, according to the present embodiment, by focusing on differences in the pilot phase pattern in the 1st and 2nd symbols starting from the beginning of the LTF1, the wireless communication device 700 determines the transmission mode on the basis of the power of the estimated channel state value calculated using the pilot pattern of each transmission mode (transmission format) and the received signal (frequency-domain OFDM signal). In so doing, the transmission mode may be accurately detected, and communication efficiency may be improved.

Embodiment 8

In the present embodiment, the transmission mode determination unit 202 of the wireless communication device 100 in Embodiment 1 (FIG. 5) or Embodiment 2 (FIG. 7) determines the transmission mode using differences in the number of peaks in the correlation obtained as a result of pattern matching, or alternatively, in the time period during which the peaks periodically appear.

Figure 30A:
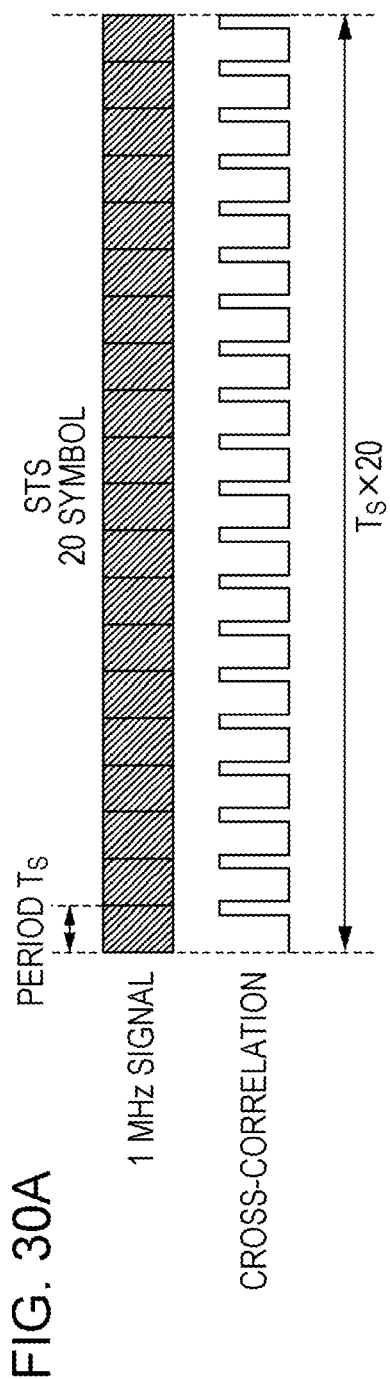
FIGS. 30A and 30B are diagrams illustrating examples of cross-correlation values in the STF according to Embodiment 8 of the present disclosure.

For example, as illustrated in FIG. 30A, in the case of the 1 MHz transmission format, 20 STS are placed in the STF. Thus, as illustrated in FIG. 30A, there are 20 peaks in the correlation obtained as a result of pattern matching with a pattern internally held in the receiver (wireless communication device 100), and the time period during which the peaks periodically appear is $T_S \times 20$.

Figure 30B:
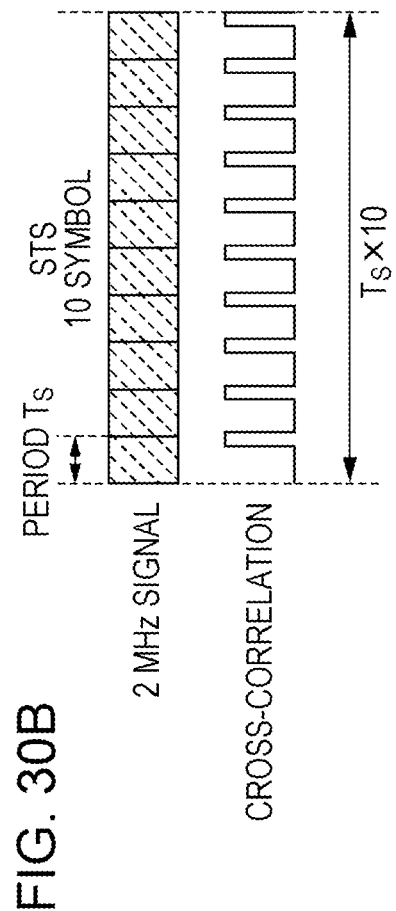

Meanwhile, as illustrated in FIG. 30B, in the case of the 2 MHz transmission format, 10 STS are placed in the STF. Thus, as illustrated in FIG. 30B, there are 10 peaks in the correlation obtained as a result of pattern matching with a pattern internally held in the receiver (wireless communication device 100), and the time period during which the peaks periodically appear is $T_S \times 10$.

Similarly, in the LTF, differences occur between 1 MHz and 2 MHz in the number of peaks in the correlation as well as the time period during which the peaks periodically appear.

Accordingly, in the present embodiment, the transmission mode determination unit 202 (FIG. 5 or 7) determines the transmission format used in the received signal on the basis of the number of peaks in the pattern matching result (correlation) received from the pattern matching units 201-1 to 201-4, or alternatively, the time period during which the peaks in the above correlation periodically appear.

For example, when there are 20 (or approximately 20) peaks in the above correlation, or when the time period during which the peaks in the correlation periodically appear is $T_S \times 20$ (or approximately $T_S \times 20$), the transmission mode determination unit 202 determines that the 1 MHz format is being used in the received signal. Similarly, when there are 10 (or approximately 10) peaks in the above correlation, or when the time period during which the peaks in the correlation periodically appear is $T_S \times 10$ (or approximately $T_S \times 10$), the transmission mode determination unit 202 determines that the 2 MHz format is being used in the received signal.

In this way, according to the present embodiment, by focusing on differences in the number of symbols in the STF or the LTF for each transmission format, the wireless communication device 100 determines the transmission mode on the basis of the received signal, and the number of peaks in the result of a pattern matching process (the correlation) with a stored preamble pattern, or the time period during which the peaks periodically appear. In so doing, the transmission mode may be accurately detected, and communication efficiency may be improved.

The foregoing thus describes exemplary embodiments of the present disclosure.

Note that the transmission mode determination methods described in the exemplary embodiments may also be combined. For example, the transmission mode determination method of Embodiment 3 and the transmission mode determination method of Embodiment 4 may be combined.

Also, the structural elements (function blocks) of the wireless communication device described in the foregoing exemplary embodiments may be realized as an integrated circuit via LSI. In this case, the respective structural elements may be realized individually as separate chips, or as a single chip that includes some or all structural elements. Also, although LSI is discussed herein, the circuit integration methodology may also be referred to as IC, system LSI, super LSI, or ultra LSI, depending on the degree of integration.

Furthermore, the circuit integration methodology is not limited to LSI, and may be also be realized with special-purpose circuits or general-purpose processors. A field-programmable gate array (FPGA) capable of being programmed after fabrication, or a reconfigurable processor whose circuit cell connections and settings may be reconfigured, may also be used.

Furthermore, when circuit integration technology that may be substituted for LSI appears as a result of progress in semiconductor technology or another derived technology, obviously the new technology may be used to integrate the function blocks. Biotechnology applications and the like are also a possibility.

In addition, the wireless communication device and wireless communication method indicated in the foregoing exemplary embodiments may also be realized using a method that conducts at least part of the processes described herein.

Also, at least part of the operating procedures of the wireless communication device indicated in the foregoing exemplary embodiments may be stated in a program, and a central processing unit (CPU) may read out and execute such a program stored in memory, or the program may be saved to a recording medium and distributed or the like, for example.

Also, the foregoing exemplary embodiments may also be realized by combining any devices, method, circuit, or programs that conduct part of the processes that realize the foregoing exemplary embodiments. For example, part of the configuration of the wireless communication device described in the foregoing exemplary embodiments may be realized with a wireless communication device or integrated circuit, while the operating procedures conducted by the configuration other than that part may be stated in a program, and the foregoing exemplary embodiments may be realized as a result a CPU reading out and executing the program stored in memory, for example.

The present disclosure is useful for a communication system that selectively uses multiple transmission modes having differences in the preamble and signal placement, such as IEEE 802.11 ah.

What is claimed is:

1. A wireless communication device comprising:
   a receiver, which, in operation, receives a signal having a short training field (STF) that includes a plurality of symbols, the received signal being in one of a plurality of transmission formats that use at least one of a first frequency band and a second frequency band; and
   a determiner, which, in operation, determines the transmission format of the received signal,
   wherein a number of symbols in the STF of a second transmission format, which uses both of the first frequency band and the second frequency band, is half a number of symbols in the STF of a first transmission format, which uses one of the first frequency band and the second frequency band; and
   wherein the determiner includes:
   a delay unit, which, in operation, delays the received signal by a first time period corresponding to the number of symbols in the STF of the second transmission format; and
   a mode determiner, which, in operation, determines that the received signal is in the first transmission format when a correlation value between the received signal without delay and the delayed received signal is equal to or greater than a predetermined value during a second time period that starts when the first time period elapses and ends when a time period corresponding to half the number of symbols in the STF of the first transmission format elapses, and determines that the received signal is in the second transmission format when the correlation value is less than the predetermined value.

2. A wireless communication method comprising:
   receiving a signal having a short training field (STF) that includes a plurality of symbols, the received signal being in one of a plurality of transmission formats that use at least one of a first frequency band and a second frequency band; and
   determining the transmission format of the received signal,
   wherein a number of symbols in the STF of a second transmission format, which uses both of the first frequency band and the second frequency band, is half a number of symbols in the STF of a first transmission format, which uses one of the first frequency band and the second frequency band; and
   wherein the determining of the transmission format of the received signal includes:
   delaying the received signal by a first time period corresponding to the number of symbols in the STF of the second transmission format;
   determining that the receive signal is in the first transmission format when a correlation value between the receive signal without delay and the delayed received signal is equal to or greater than a predetermined value during a second time period that starts when the first time period elapses and ends when a time period corresponding to half the number of symbols in the STF of the first transmission format elapses; and
   determining that the received signal is in the second transmission format when the correlation value is less than the predetermined value.

* * * * *